United States Patent [19]

Groothuis

[11] 4,191,956
[45] Mar. 4, 1980

[54] DEVICE FOR THE DISPLAY OF DATA ON A DISPLAY APPARATUS

[75] Inventor: Hermanus H. H. Groothuis, Eindhoven, Netherlands

[73] Assignee: U.S. Philips Corporation, New York, N.Y.

[21] Appl. No.: 896,770

[22] Filed: Apr. 17, 1978

[30] Foreign Application Priority Data

Apr. 22, 1977 [NL] Netherlands .................. 7704398

[51] Int. Cl.² .................................... G06K 15/18
[52] U.S. Cl. .......................... 340/789; 340/152 R; 340/799; 340/711; 364/900
[58] Field of Search .............. 340/798, 799, 800, 789, 340/152 R

[56] References Cited

U.S. PATENT DOCUMENTS

| 3,242,470 | 3/1966 | Hagelbarger et al. | 364/900 |
| 3,631,455 | 12/1971 | Gregg | 340/152 R |
| 3,792,465 | 2/1974 | Collins et al. | 340/168 S |
| 4,012,723 | 3/1977 | Harper | 340/798 X |

*Primary Examiner*—David L. Trafton
*Attorney, Agent, or Firm*—Thomas A. Briody; James J. Cannon, Jr.

[57] ABSTRACT

A device for displaying page data on a television monitor, having a foreground memory and a background memory. The foreground memory has a capacity of one page of text. The background memory has serial sub-memories connected in parallel, each sub-memory containing part of a character, so that together the sub-memories contain the relevant character within a series of characters. The characters become serially available on the outputs of the sub-memories for transfer, to the foreground memory. The sub-memories may be magnetic bubbles. Each of said sub-memories preferably is a single loop so that intermediate control during the transfer of a page of data is very simple. The foreground memory is preferably a random access memory which can be addressed. The output of the memory has connected to it a counter with sub-counting cycles having a length of one line on the display apparatus in order to form the lines to be displayed thereon.

13 Claims, 18 Drawing Figures

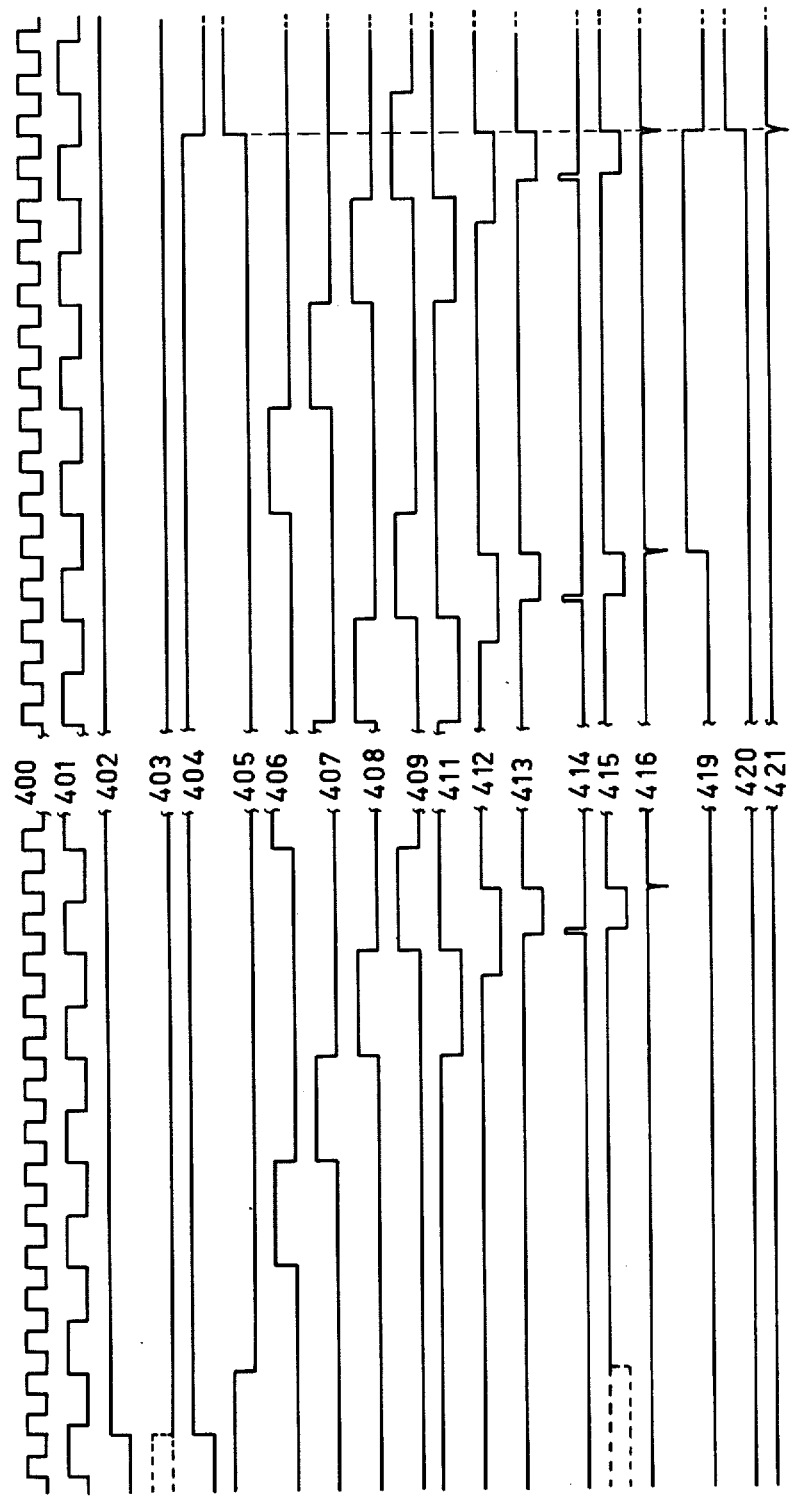

DEVICE FOR THE DISPLAY OF DATA ON A DISPLAY APPARATUS

BACKGROUND OF THE INVENTION

1. Field of the Invention

The invention relates to a device for the simultaneous display of data in the form of a page on a display apparatus during a given time interval, comprising a data connection for receiving data signals, a foreground memory having an input which is connected to the data connection and an output which is connected to an input of the display apparatus, said foreground memory being adapted to store the data of a page during said interval, said device furthermore comprising a control member having an output which is connected to an input of a control device for unblocking the input of the foreground memory. Such a device would serve as a display terminal in a so-called Teletext system.

2. Description of the Prior Art

Teletext is the generic name for systems utilizing the normal television channels for transmitting written or graphic material which can subsequently be displayed on customary, simple receivers, possibly after a simple intermediate operation. The material to the displayed is organized according to pages, it being possible to display exactly one page on the display apparatus. The Teletext system has been in extensive experimental use in Great Britain since September 1974 on the public broadcast system. An extensive documentation on how to adapt a commercial TV receiver to the system has been described in a series of articles in Wireless World, a magazine primarily intended for radio amateurs in the following issues: November 1975, p. 498, December 1975, p. 563, January 1976, p. 37, February 1976, p. 47, March 1976, p. 75, April 1976, p. 64, May 1976, p. 64, June 1976, p. 53. In principle, a plurality of pages could be displayed together, but in that case they would be smaller. The pages are transmitted by a transmitter in a predetermined sequence. The user selects one page of data to be displayed either without priority or on the basis of reference data contained in a previously displayed page, or the user selects the pages successively like when reading a book.

SUMMARY OF THE INVENTION

The invention has for its object to reduce the time required for selecting a next page by avoiding the necessity of waiting for this page to be received from outside. This is because if the number of pages to be selected is very large, the time required for transmission is accordingly long. The invention aims to enable storage of a number of pages which may be displayed eventually. The invention has for its object to enable this to be performed in an expensive medium. The invention aims to provide a simple organization of the data transmission to the foreground memory.

The objects in accordance with the invention are realized in that the device furthermore comprises a background memory which is connected between the data connection and the foreground memory and which is adapted to store the data of at least two pages, its input which is connected to the data connection being unblocked by an output signal of the control device. Said background memory comprises at least two parallel-connected serial sub-memories which together store the complete data of one page, each of said sub-memories containing at least part of the data of at least two pages, said background memory being adapted to successively supply the data of a page, up to a predetermined length of the data, under the control of a relative starting address signal from the control device, to the foreground memory by unblocking its input in order to progressively store the data thus supplied as from a predetermined starting address in the foreground memory. The said data connection is unilateral in the teletext system: the successive pages are serially transmitted by a transmitter. This does not impose a restriction on the invention, because the data source may be a computer or data base which may be accessed for only a small fraction of the time. The filling of the background memory can also be initiated by said control device in a question/answer situation with respect to the data source. The data in the background memory are organized in units of one page which are fetched to the foreground memory as a unit. As a result, use can be made of serial sub-memories which can be manufactured according to a technology which is less expensive than that used, for random access memories.

In the following, first several general aspects of the invention are mentioned briefly, a detailed embodiment being disclosed with respect to the drawings.

Preferably, said background memory comprises at least one module which contains a number of parallel-connected serial sub-memories which equals the number of bit signals of the code of a character to be displayed on the display apparatus, said serial sub-memories being adapted to communicate in parallel with an input or output of the module when connected thereto. Thus, all code bits of a character appear together on the output of a module. This results in a high transfer speed and an attractive possibility of organizing parity checks and the like. On the other hand, it is alternatively be possible for the characters to be stored in a different manner. For example, in the case of eight bits per character, these bits may be stored in four serial sub-memories, each of which contains two bits, or they may even be stored in a single serial sub-memory. In the latter case, storage is effected alternately by character (interleaving) between the serial sub-memories.

Preferably, the serial sub-memories are constructed according to the magnetic bubble technique. Magnetic bubbles constitute inexpensive storage medium. Moreover, storage is non-volatile, even if no energy is supplied in a rest condition.

Preferably, the serial sub-memories are constructed according to the charged coupled device technique (CCD). CCD devices of this kind constitute a further inexpensive, serial storage medium.

Preferably, said background memory comprises a counter having a counting input which receives counting pulses, together with shift pulses for said serial sub-memories, the counting position thereof thus corresponding to a shift of the data in said serial sub-memories, an access device of the background memory being unblockable exclusively under the control of a signal from the control device and as from a predetermined counting position from a number of counting positions which equals the number of page parts which can be accommodated in a serial sub-memory, said predetermined counting position being selected by said signal. As a result of this mode of control, the data of a page to be displayed become available in accordance with a fixed sequence to or from the background memory, for example, always starting with the first character on the top row of characters. The page start may be detected from the known "header" configuration. Thereby, the access device to a large extent may correspond to the known system cited supra.

Preferably, after having received an unblocking signal, the access device of the background memory can be blocked again by an output signal of said counter after a number of shift pulses for the background memory which corresponds to the storage length of a part of a page in a serial sub-memory. Direct memory access (DMA) is thus realized for transferring a page of text information under very simple control. Notably, large sections of the control device can then remain free for performing other functions.

Preferably, for generating a complete unblocking signal said counter has a first position at a beginning of a partial cycle within said first cycle for generating thereby a partially unblocking signal as a final contribution to said complete unblocking signal, thereby enabling the access to one page part within a serial sub-memory and a second position which is later than said first position by as much as corresponds to the length of one page part within a serial sub-memory for generating without of further signals a complete reblocking signal. Thereby, the detection of the beginning of a predetermined partial cycle will start a direct memory access (DMA) with respect to the background memory while the detection of the end of that particular partial cycle will terminate the direct memory access.

Preferably, said counter has sub-cycles with a length of one line of said page, said foreground memory being a random access memory having a predetermined capacity, said counter comprising, in addition to said sub-cycles of mutually equal length, an additional sub-cycle of shorter length, so that the aggregate lengths of the sub-cycles within a partial cycle whose length corresponds to the capacity for one page part within a serial sub-memory corresponds to said predetermined capacity of the foreground memory. Thus, easy translation to the display at the format of a page is possible. The capacity of the foreground memory can then be fully utilized by the aggregate of sub-cycles. The additional sub-cycle is used for matching the two capacities, where the length of a partial cycle differs from integral number of full lines of text, due to specific design criteria.

Preferably, said foreground memory comprises an address converter, with an input for receiving an address consisting of a line number or a character number from the control device or from the output of said counter, respectively, in order to form a direct memory address for the foreground memory, which furthermore has an address input connected to an address output of the display apparatus. The foreground memory is thus accessible in two ways: on the one hand, by a word number of the sequential transfer of a number of character codes, and on the other hand by a line/character-on-the-line number for the specific addressing of a given character in the manner of a two dimensional cursor device whose use has proven to be advantageous for display apparatus. In case the foreground memory has random access capability the address length is shorter thereof than the character-plus-line address.

Preferably, the foreground memory comprises a time multiplex device for rendering the address input of the foreground memory alternately accessible, during successive memory cycles of the foreground memory, to the address output of the display apparatus for supplying character data for display, and to an address output of said address converter for communication transfer. Optimum use is made of the accessibility of the foreground memory as a result of such an elementary time multiplex organization.

Preferably, the recurrence time of a memory cycle for a communication transfer in the foreground memory is smaller than the repetition time for the shift pulse for the background memory, there being provided an auxiliary timing device for activating, whenever a data word position has been prepared by the background memory for transfer, a character code, a memory cycle of the foreground memory in order to execute said transfer. The memory cycles of the foreground memory which are reserved for the background memory are then correctly addressed, so that slower serial sub-memories can also be used.

BRIEF DESCRIPTION OF THE DRAWINGS

The invention will be described in detail hereinafter with reference to the accompanying diagrammatic drawings.

DESCRIPTION OF THE PREFERRED EMBODIMENT

Figure 1:
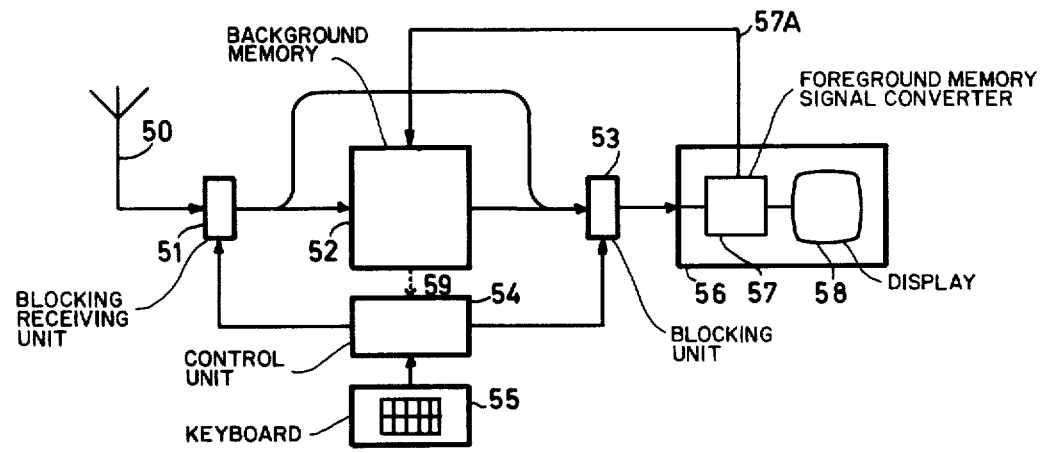
FIG. 1 shows a first block diagram of a device in accordance with the invention.

FIG. 1 shows a block diagram of a device according to the invention wherein the main emphasis is placed on the most important transfer directions. The aerial 50 is connected to the blocking/receiving unit 51. Therefrom the data are transferred to the background memory 52 and the blocking unit 53. The data of the background memory 52 are also supplied to the blocking unit 53. The transferred data are supplied to the foreground memory/signal converter 57. The data stored therein are repetetively and sequentially supplied to the display apparatus 58 for display, in synchronism with the television scan. Note that the apparatus 58 has no further frame storing means. Note furthermore that the background memory stores further display pages (frames) which are available even if the data source (aerial 50) does temporarily or finally not provide these pages. The data of the foreground memory, possibly after modification under manual control on device 55 may return to background memory 52 via return line 57A. The units 51/53 are controlled by the control unit 54. This unit receives signals from the keyboard member 55 as will be described with reference to FIG. 2. A further possibility is that the keyboard member 55, by calling a particular stored program or alternatively directly by means of a character stroke, modifies the data in the foreground memory 57 by using a known two-dimensional cursor device. Also, certain television games can be played because program data are supplied from the background memory to the control unit 54 via the line 59. The data in the background memory 52 may concern one page showing a game board, for example, a draught board with slidable and removable (erasable) men, three pages of rules to be displayed, examples and the like, and four pages of program. A variety of operations are executed according to the program. For example, a man "taken" is automatically erased or a prohibited move is indicated, with or without reference to a passage in the rules. If instead of an aerial a data communication line is present, the data present in a background device (for example, a disk memory) can also be updated. The elements 57, 58 are combined in a display apparatus 56. The arrangement of FIG. 1 in appreciable aspects conforms to page 566, FIG. 3 of the December issue of the series cited before, whereby however are sent directly to the foreground memory (i.e. elements 52 and 53, notably are absent). In this respect, furthermore, a more commercial and easy-to-use version of a Teletext-receiver has been implemented in the Philips Color Television Receiver type 26 C 668/12Z. An embodiment of background memory 52 will be described in relation to FIG. 5. Also where such a serially operated memory provides its contents, including identification signals, in a continuous sequence at the output thereof, blocking unit 53 may be constructed in a similar way as blocking unit 51, accommodating the functions of storing search data, comparing search data with an identification data, upon identification transmitting the display data of one page along a gated data path of suitable bit width therein.

Figure 2:
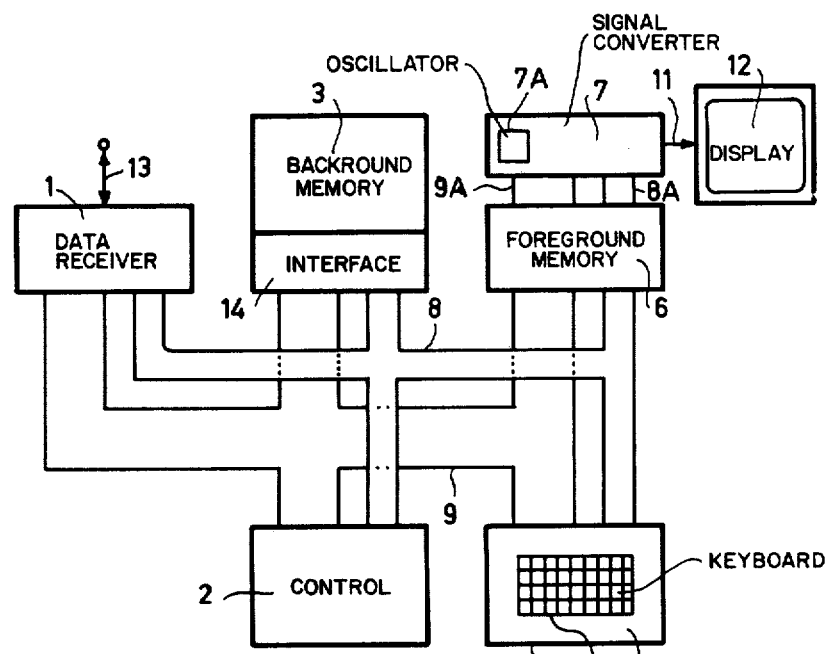
FIG. 2 shows a second block diagram of a device according to the invention.

FIG. 2 shows a further block diagram of a device according to the invention, which has been organized around a common bus structure. The device comprises a data link 13, a data receiver 1, a data bus line 8, an address bus line 9, a control device 2, a background memory 3, an interface 14, a foreground memory 6, a signal converter 7, a control member 4 with a keyboard element 5, a connection 11, and a display apparatus 12. A control bus line, not separately shown in the drawing, extends parallel to the address bus line.

The data to be displayed are supplied via line 13, which may be a conventional data communication line, for example a common carrier line. The data receiver comprises a standard modem of the type SEMA-TRANS 1203 by ACIA and a serial-to-parallel converter of the type MOTOROLA MC 6850, which has been designed as an input/output device in the Motorola 6800 series. The data are organized according to separate pages. Each page is preceded by indication information, so that it possible to perform a search on indication information by comparison of decoded indication information with a desired indication (for example, page number) which is supplied via line 8 by the keyboard or by the control device 2. In this embodiment, the data bus line 8 has a width of 8 bits; the address bus line 9 has a width of 16 bits. The data of a page desired by a user are supplied to the interface 14 after reception in and passage through the unit 1, via the line 8. The unit 14 contains read/write amplifiers for accessing the background memory 3, and furthermore synchronizes the operation of the background memory and the data received on line 13, for example by periodically generating a clock pulse for a rotary field driver for the memory 3 in case the latter operates with magnetic bubbles. A page to be displayed is addressed in memory 3 by a signal from control device 2, to be discussed later, via the control bus line, and a three-bit page address signal via line 8. To this end the control device can receive an initiation signal, via the control bus line, from the control member 4. The page thus addressed is transferred to the foreground memory 6, one character after the other, via the line 8, the signals being adapted and synchronized in the interface 14. The data received in the receiver 1, however, can alternatively be directly supplied, via the line 8, to the foreground memory 6. The data stored in the foreground memory 6 are converted in the signal converter 7 to form a video signal which is supplied, via the line 11, to the display apparatus 12. The address bus 9 can transfer address signals and other control signals can be transferred parallel thereto along said control bus line, each of the elements 1, 2, 4, 6, 14 being in principle capable of receiving as well as transmitting said control signals. In the present embodiment, only the elements 2, 14 are adapted for transmission. As will be explained hereinafter, the lines 8A, 9A between the elements 6 and 7 are not directly connected to the corresponding lines 8, 9. Similar connections are provided for the data bus line 8. The keyboard 5 can be used for selecting one or more pages in the background memory 3 as well as from the data received in the receiver 1.

In the following the specific elements of the latter arrangement will be described in detail. It would be obvious that only slight modification would be required for implementing FIG. 1 with such elements.

The Display Apparatus

The display apparatus 12 shown in FIG. 2 may be a customary black/white or color television receiver, the input line 11 being adapted to receive a complete video signal, for example, encoded in accordance with the PAL or NTSC system, said signal being processed in the display apparatus in order to extract color, synchronization and brightness signals therefrom in known manner. The line 11 may also be of a multiple construction, the brightness signals for red, green and blue and the synchronization signals then being separately supplied. In the latter case, improved display quality is achieved. In the case of a black/white television receiver, obviously a single brightness signal suffices. On the other hand, the display apparatus may also be constructed, for example, as a panel consisting of grid elements which luminesce or not. For example, such a grid element may be provided with a liquid crystal. The display may be static, in which case each luminescent position need be written only once for each new page to be displayed. In that case, therefore, one memory cell of the foreground memory is combined with the corresponding picture element of the display apparatus to form one functional unit in accordance with the foregoing. The display may also be dynamic, as in the case of cathode-ray tubes. Periodic rewriting according to a scanning sequence of some kind is then necessary. For the sake of brevity, the organization of this rewriting procedure is not elaborated. According to the cited Teletext standards, the display is organized according to 24 lines of at the most 40 characters each. This does not form a restriction for the present invention, because it can also be used for other organizations involving the simultaneous display of a smaller or also a much larger number of characters. In the case of, for example, 24 lines of 80 characters each, the organization could also be according to 2x (24 lines of 40 characters). In that case there would be two pages of data to be displayed; these pages would have to be separately stored in the foreground memory.

The Signal Converter

The signal converter 7 of this embodiment is connected to the foreground memory 6 by way of a data line 8A and an address line 9A. These lines are of the same construction as the data bus line 8 and the address bus line 9, respectively, of the other part of the system. The signal converter 7 furthermore comprises an oscillator 7A having an oscillation frequency of 30 MHz. Various synchronization signals for the television display apparatus 12 are derived therefrom by division, said signals being supplied to the display apparatus via a line which is not separately shown. Derived divider frequencies are inter alia 12, 6, 2, 1 and 0.4 MHz. This oscillator may be situated elsewhere in the system, for example, in the control device 2.

Figure 3:
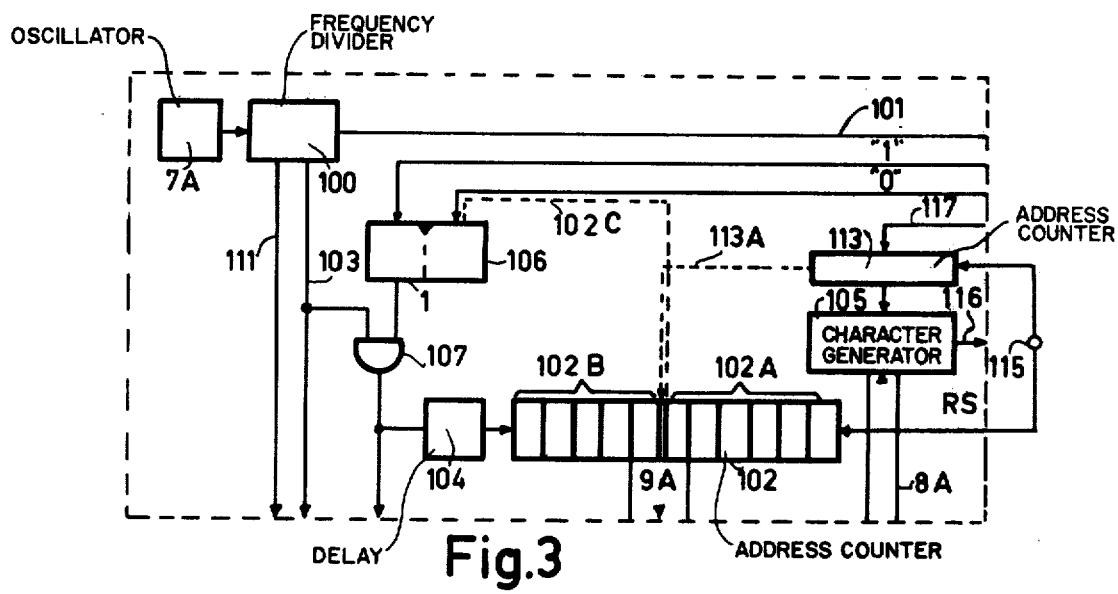
FIG. 3 shows the clock-driven addressing means for extracting character data from the foreground memory for display on the television tube, and a character generator therefor.

FIG. 3 shows a further elaborated partial diagram of the signal converter 7. The element 100 is the frequency divider. The line 101 carries the synchronization pulses for the display apparatus 12. The signal converter supplies clock pulses on the lines 111 and 103, each of said clock pulses having a frequency of 1 MHz and being phase shifted approximately 180° with respect to each other. There is also provided an address counting line 117 in order to advance an address counter 113 by one unit once per picture line (for example, at the beginning thereof) in the case of a television monitor. This address counter comprises as many positions as there are picture lines in a line of characters (including the spacing between the lines), and thus continously circulates during display. The line 103 then carries a synchronization pulse in order to be capable of initiating a data transfer from the foreground memory 6 once per microsecond. This takes place as long as the AND-gate 107 conducts as result of a "1" signal from JK flipflop 106, the "J" input thereof bearing the indication "1", the K input thereof bearing the indication, "0". This flipflop generates a "1" output signal during the display of a row of characters, i.e. each time during a sub-cycle of 40 pulses on the line 103 (to be discussed hereinafter). When a pulse appears on the "1" control line of this flipflop, the flipflop is set to the "1" position after a predetermined period of time after the beginning of a sweep of the electron beam in the display apparatus; the margin is thus determined. This signal may be the same as that appearing on the line 117. When a signal appears on the "0" control line, the flipflop 106 is reset at the end of the part of the line to be displayed (i.e. once per television line). In this embodiment, the foreground memory has a cycle time of less than 500 ns. This property will be elaborated hereinafter.

In this embodiment, the foreground memory has adequate capacity for one of the said $24 \times 40 = 960$ characters or spacing characters. The characters are organized according to a character matrix of $6 \times 10$ points. The actual character occupies a region thereof which measures $5 \times 7$ points. Successive characters in a line are separated by a spacing comprising $1 \times 7$ points. Successive lines of characters are separated by a spacing of three picture lines. Obviously, the described organization of the character matrix is merely given by way of example. If desired, given lowercase characters (for example, p.q.) may project two picture lines below the line. It is known to use a so-called "graphic mode". The "characters" thereof need not represent letters, digits and the like, but may also be, for example, elementary parts of a map. These "characters" may fill the entire matrix of $6 \times 10$ image points. This field is then divided, for example, into 6 approximately equally large areas which may be illuminated or not. Upon reception of said clock pulse, via the gate 107, and an address from an address counter 102 (see also FIG. 4), the foreground memory 6 supplies a data word of seven bits, the counting position of the counter 102 being raised by one unit, for example, after 500 ns via a delay member 104. Said data word contains the code of a character, for example, in accordance with the ASCII code or a code derived therefrom. The seven character bits are supplied, via the information line 8A, together with the address of the picture line counter 113, to the character generator 105 which supplies character signals in known manner to the display apparatus 12. For each addressing, the character generator 105 supplies the image information of six picture points (inclusing, if applicable, one spacing image point) in parallel. The data are subsequently serially supplied as a video signal to the display apparatus, via the line 116 and by way of parallel/series conversion, under the control of a pulse series having the repetition frequency of 6 MHz. The counter 102 thus counts 40 pulses per television line. At the end of a picture line, it is reset in that the last six bit positions (102A) of this counter are coupled endaround so as to form a ring counter comprising 40 steps in a manner to be described with reference to FIG. 7. In the case of a series of ten successive television lines, the carry output signal of these six least-significant bits are suppressed nine times. At a given line, for example, at the tenth line, this carry output signal is conducted in order to advance the most-significant five bit positions (102B) one step. This signal may be, for example, the output carry signal of the ten-counter 113, as denoted by the broken line 113A. If desired, this signal can be used without further co-operating signals. The carry output signal of the counter-to-forty may then also be used for resetting the flipflop 106 to the "0"-position via the line 102C. Thus, once every ten picture lines, the video signal is generated for a line of at the most 40 characters. Using the seven-bit ASCII code, 128 different words can be formed in principle; 96 words thereof are used for a specific character shapes. The 32 additional control characters may indicate an additional selection, such as a changeover from the alphanumerical to the graphic mode or the changing of the color to be displayed (cf: the March volume of the above cited series, p. 79). Besides said controls for incrementing, a reset signal for the addressing of the foreground memory or the position of the picture line counter for addressing the character generator can be generated by the display apparatus on the terminal 115 at the end of the last line/picture line of the picture on the display apparatus. The display apparatus thus receives synchronization signals on line 101, and supplies control signals on line 117. The parallel-series conversion on line 116 is not shown. The setting of the flipflop 106 may be permitted as from a given level in the picture, be it only during 24 lines. A carry output signal of counter 102B may thereupon reset flipflop 106.

The Foreground Memory

The foreground memory 6 is connected to receive addresses via the address line 9A and to supply data via line 8A. From signal converter 7 only reading operations are initiated in foreground memory 6. The foreground memory 6 is furthermore connected to the address bus line 9 in order to receive addresses, and to the data bus line 8 for data transfer. In a simple configuration, line 8 is used only for supplying data. This is effected in an alternating manner with the reading by the signal converter 7, i.e. in synchronism with the numbered pulses appearing on the line 111 in FIG. 3. This may continuously take place, i.e. also outside the scanning time of the television lines. The foreground memory thus operates according to a time multiplex system. As a result of the cycle length of 500 ns, there is no interference. Time multiplex control of memories is known in the prior art.

A preferred embodiment of the foreground memory 6 is bit organized, and comprises seven integrated memory chips, each of which contains 1024 bit positions, so that for each chip there are 64 bit positions which are not used for the storage of the 960 characters to be displayed.

Figure 4:
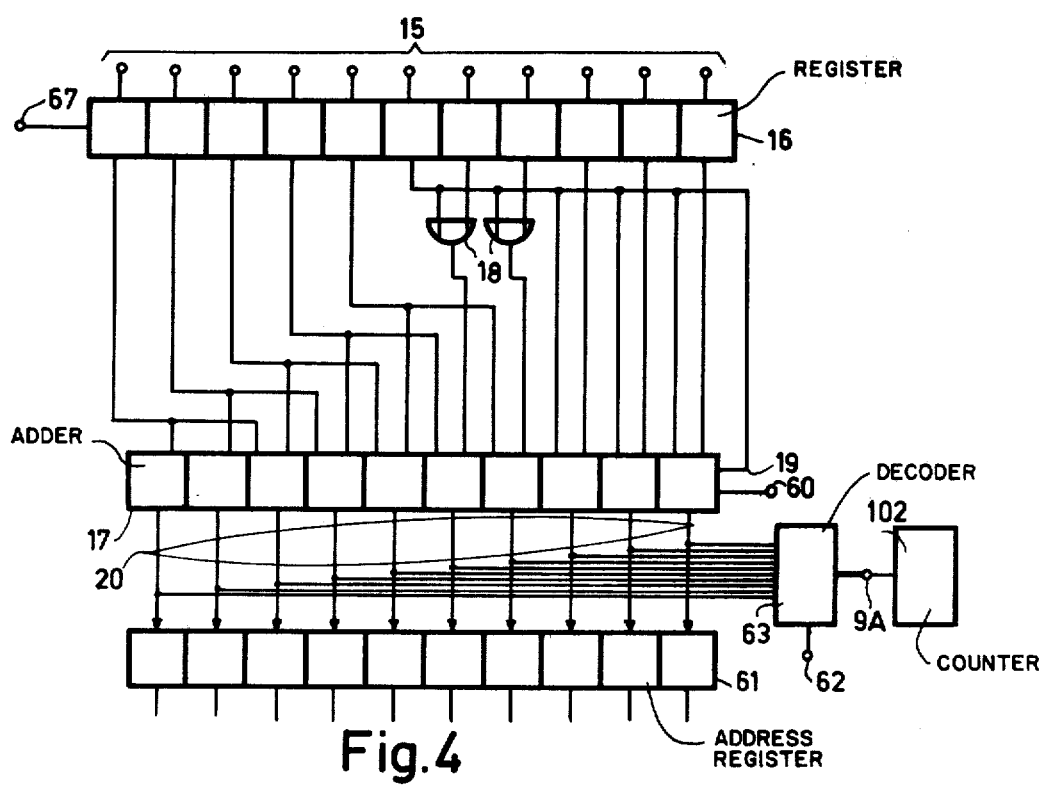
FIG. 4 shows an adder for converting the eleven bit address generated by the arrangement of FIG. 3 to a ten-bit random access memory address for the foreground memory.

FIG. 4 in this respect shows details with regard to the control of the foreground memory, notably an address converter. In the present embodiment, the foreground memory is constructed as a random access memory (RAM). Alternatively, it could also be constructed as a serial memory. The address converter is used to enable addressing of the foreground memory by supplying the line number (having the value range 0 . . . 23) and the character number (having the value range 0 . . . 39). Thus, two different categories of addresses can be supplied to the foreground memory 6: on one hand, addresses in a complete sequence, for example, from zero to the upper limit determined by the capacity of the relevant memory (in this case 1023), and on the other hand addresses in the form of a combination of a line number and a character number. The latter address mode can be advantageously generated by the keyboard device 4 and, as has been explained, this address mode is also used by the display apparatus for extracting a character to be displayed. In the present embodiment the 0–1023 addresses are developed internally in the foreground memory on the basis of the character-and-line addresses. The address converter operates as follows: the input 15 is connected to the address bus line 9A and receives eleven-bit words, the bit-wise organization of which is: $r_4 r_3 r_2 r_1 r_0 k_5 k_4 k_3 k_2 k_1 k_0$, the significance of the bits decreasing from the beginning towards the end. For valid addressing of the foreground memory, the five bits $r_4 \ldots r_0$ containing the line address may have a value range in the interval [0,25]. The line addresses 24 and 25 do not form part of the normal display range. The last six bits $k_5 \ldots k_0$ contain the character address which lies in the interval for the line values in the interval [0,24], and in the interval [0,23] for the line address 25. As result, the entire foreground memory can be uniquely addressed. The line 24 is intended for data for internal use which can indicate the identity of the page to be displayed. This line is also used in the case of communication with a data source. Line 25 is not used, but could be utilized in the same manner as line 24. The lines having the line addresses 24, 25 are generally not displayed on the display apparatus, but this need not be so. The address converter converts the eleven-bit address into a ten-bit address for the foreground memory. It follows from the described organization that all memory positions of the foreground memory have a specific function. The multiple input 15 is connected to an eleven-bit register 16 in which the logic address ($r_4 \ldots k_0$) is stored, the most significant bit $r_4$ being present at the extreme left. Subsequently, $(r_4 \ldots r_0) \times 40 + (k_5 \ldots k_0)$ is calculated. This is treated as $(r_4 \ldots r_0) \times 32 + (r_4 \ldots r_0) \times 8 + (k_5 \ldots k_0)$. Each of the bits of the logic line address is supplied to two adding stages of the adder 17 which are spaced a factor of 4 (two binary positions) apart. The three least-significant bits ($k_2 \ldots k_0$) are supplied to the three least-significant stages of the adder 17. The bits $k_4$, $k_3$ are supplied, via the OR-gates 18, to the stages of next higher significance of the adder 17. When the character address is at the most 31, the bit $k_5 = 0$ and no interference occurs between different bits. If $k_5 = 1$ (with a decimal value of 32), this bit is recorded as $(31+1)$ and the value 31 is then supplied as (11111) to the five least-significant stages of the adder 17 and, moreover, a "1" bit is supplied to the input 19 which is otherwise not used and which is intended for the input carry signal of the least-significant adding stage. In that case, $k_4 = k_3 = 0$, so that interference is again avoided. Thus, the physical address is calculated by means of a two-input adder, said address appearing on the multiple output 20. The operation of the counter can be synchronized by a clock pulse on the terminal 60. This may be, for example, the clock pulse on the line 111 in FIG. 3, having a pulse frequency of 1 MHz. Thus, the result of the addition is stored in the address register 61 of the storage modules of the foreground memory which are not separately shown in this Figure. Thus, the adder 17 operates once every microsecond for the recurrent addressing of the same address in the foreground memory. The register contents are erased by a signal on the terminal 67. As will be explained hereinafter, the addressing by the interface of the foreground memory also takes place on the basis of line number and character number, so that the input 15 is used for the same kind of address each time. The output pulses of the AND-gate 107 of FIG. 3 control the incrementing of counter 102 which similarly supplies a line/character-on-the-line address which is thus converted in a corresponding manner. This is realized in the symbolically denoted decoder 63 which may have similar elements as register 16, adder 17 and gates 18. The signals on lines 111 and 103 constitute an enable signal for the foreground memory for controlling an access therein. Thus, reading (by the display apparatus) and writing (for the control member or background memory) can be alternately performed in the foreground memory. The units 17, 61, 63 thus constitute a ten-bit multiplexer, the selecting signals being receivable on respective inputs 60, 62. It is alternatively feasible to have a single address converter and construct the input thereof as an eleven-bit multiplexer. It is also possible to address the foreground memory directly from the display apparatus by way of a ten-bit counter which is each time reset to the associated starting condition at the end of a line. Finally, foreground memory 6 has a data access terminal which is likewise multiplexed among data lines 8, 8A. Said terminal may be provided with a data register and read/write amplifier means of conventional construction.

The Background Memory

First, the background memory 3 (FIG. 2) will be described. In the present embodiment, the background memory 3 has a capacity of 8192 ($2^{13}$) words of 7 bits plus 1 parity bit, and it is bit organized. Each word contains the data of a character (or a separate code) and the characters are stored as a seven-bit code in the foreground memory 6 (FIG. 2) in due time. The memory 3 comprises eight memory chips, each of which has a storage capacity of 8192 bits. It is constructed according to the magnetic bubble technique. Magnetic bubbles form a known storage medium and offer the advantage of a comparatively low price per bit and a comparatively high bit rate for access to a memory chip. Furthermore, under the influence of a background magnetic field caused by a permanent magnet, the data are stored in a non-volatile manner. Thus, a continuous supply of energy is not necessary for sustaining the data.

Figure 5:
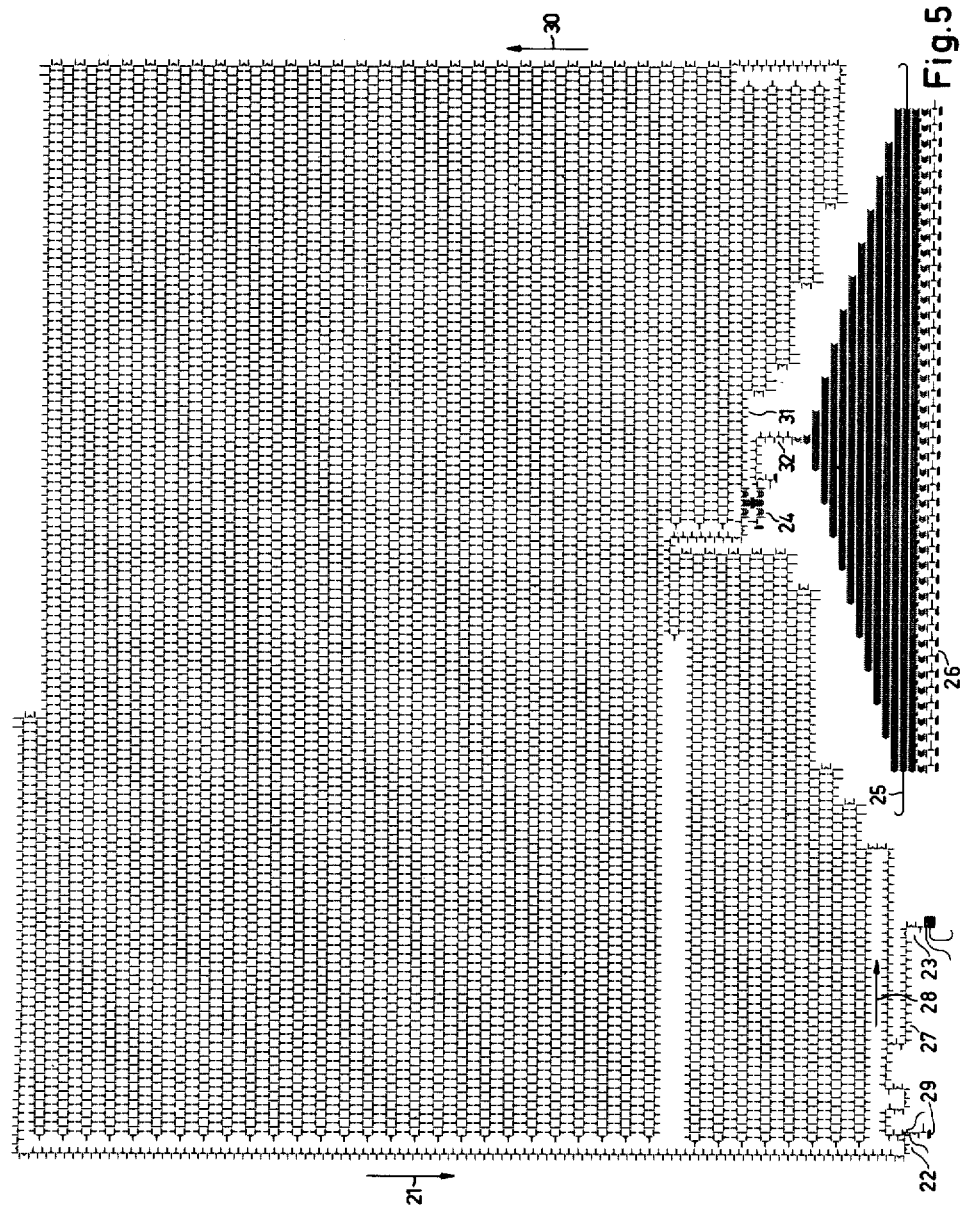
FIG. 5 shows an example of a single serial sub-memory for use in the background memory.

FIG. 5 shows one of the memory chips of the background memory. All storage positions are serially arranged along a single loop. The chip is situated in a uniform magnetic field which has a customary strength for such an application and which is directed transversely of the plane of the chip. The material of the chip is, for example, yttrium iron garnet doped with suitable substitution metals. The storage structure is formed by discrete T,I elements of soft-magnetic material, for example, permalloy. These elements form the major part of FIG. 5. Under the influence of a rotary magnetic field which is generated in known manner and whose magnetic vector rotates in the plane of the plate, preferred positions for magnetic bubbles are formed on the discrete elements. For each period of the rotary magnetic field, there preferred positions are driven over one spatial period of the discrete bubble guide structure, any bubbles present being transported along. In the case of counter-clockwise rotation, the local driving direction is according to the arrow 21. Generally, FIG. 5 comprises only known elements which will therefore be only briefly described hereinafter. The element denoted by the reference 23 is a domain (bubble) generator which splits off a bubble from a permanently present residential bubble during each period of counter-clockwise rotation of the rotary magnetic field, the splitting being co-controlled by a current pulse through the meandered current conductors which are connected to a current source (not shown). This additional excitation is a necessary condition to be fulfilled. Therefore, in accordance with the excitation, a binary "1" or "0" can be stored. This data containing bubble or void positions in a series of bubbles is driven, under the control of said counter-clockwise rotation, along the path 27 and arrives on the main path, via a converging switch, and advances in the direction of the arrow 28. The element 22 is a bubble destruction element. Normally, a bubble first moves in accordance with the arrow 21, passes the element 22 under the control of the counter-clockwise rotary magnetic field, and subsequently advances in accordance with the arrow 28. When the meandered current conductors are excited by a suitable current pulse from a current pulse generator (not shown), the element 22 becomes a diverging switch and a passing bubble turns right. This bubble is then further driven in the direction of the element 29 which operates as an absorption element. The bubble is thus destoyed. The current pulses in the elements 22 and 23 occur simultaneously when the direction of the rotary magnetic field is that denoted by arrow 30: the bubble to be split off is then situated on the left extremity of the first "T" element, adjoining the "square" element at 23. Between both these positions and the said converging switch, the distance is sixteen periods of the domain guide structure. When the element 22 is actuated, and the element 23 is not actuated, any bubble present is removed, so that a logic "0" is written. When the element 22 is actuated and the element 23 is also actuated, any bubble present is removed and replaced by another bubble, so that a logic "1" is written. It is also possible for the element 23 to be actuated alone in order to write a "1", provided a void position is definitely available. The elements 22 and 23 are then independent. The element 24 receives bubbles which move in the direction of the arrow 28. These bubbles expand in the longitudinal direction of the chevron series. After having passed the central, long row of chevrons, the bubble is split. The two parts are then driven further along the paths 31 and 32, respectively. The path 32 terminates in a number of progressively prolonged series of chevrons. The bubbles arriving are substantially stretched. When they reach the conductor 25, they can be detected by way of the magneto-resistance effect. Two series of chevrons further, the bubble is split into 43 parts (an arbitrary number). each of said parts being supplied to associated bubble absorption elements for destruction. The splitting element 24 also comprises two further absorption elements. Should the direction of the rotary field be reversed, it is prevented on the one hand that the device 25 and its surroundings can start acting as a bubble generator; these bubbles are destroyed before they reach the splitting element 24. On the other hand, as a result of its symmetrical construction, the splitting element 24 has an analogous operation in both directions. However, the superfluous splitting product is then again destroyed. The latter two absorption elements cannot be reached under the control of counter-clockwise field rotation. The described background memory can operate with bubbles having a diameter of approximately 5 microns at a rotary field frequency of 100 kHz.

The background memory 3 can accommodate a different storage medium, e.g. charge coupled devices (CCD). Memories comprising such devices are known in the prior art. They offer the advantage that a higher operating frequency can often be achieved; they have a drawback in that a continuous rewrite organization is required to compensate for charge leakage. They may be organized according to similar loop structures. The background memory may contain eight pages, each of which may completely fill the foreground memory. The number of loops may be different, for example, 2×8 loops of half the length, or having the same length, so that the background memory can store 16 pages. An advantage of this kind of memory consists in that the driving and the writing/reading of data are simple. For example, the sense of rotation of the rotary magnetic field need not be changed during operation of the memory. Further control is also simple. In this type of serial memories, random addressing is not possible, because the position of the data is not fixed with respect to the geometrical configuration of the memory. Therefore, given addresses or signals, must act as references. Other addresses are related thereto by means of a known address difference. The memory contains eight pages of 960 words (characters) each. For each block (page) there are 64 words.

Figure 6:
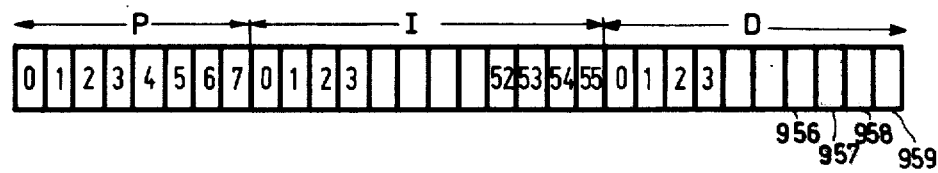
FIG. 6 shows the organization of a serial page part for storage in the background memory.

FIG. 6 shows the organization of a block stored in the background memory, each square representing an eight-bit word (one bit in each of the 8 memory chips). Each block commences with eight P-words (P0 . . . P7). These words have the same parity, for example, even, while all other words then have odd parity. The parity is determined by the eighth bit added to the seven data bits, for example, in accordance with the ASCII code. These eight bits are always present in the eighth serial sub-memory (chip) and are added in known manner by the data source (transmitter). Said eight bits can be transmitted via the data bus line 8; however, the parity bits are not stored in the foreground memory. The occurrence of said even parity during a predetermined number of successive words indicates the beginning of a block. One or two of these words, for example, P6, P7, contain the block number N which can in this example have a value in the interval [0,7]. The subsequent 56 word positions may contain control words, for example, a page number between broader limits than 0–7, or other data: I0–I55. They are followed by the "display words " D0–D959.

Figure 7:
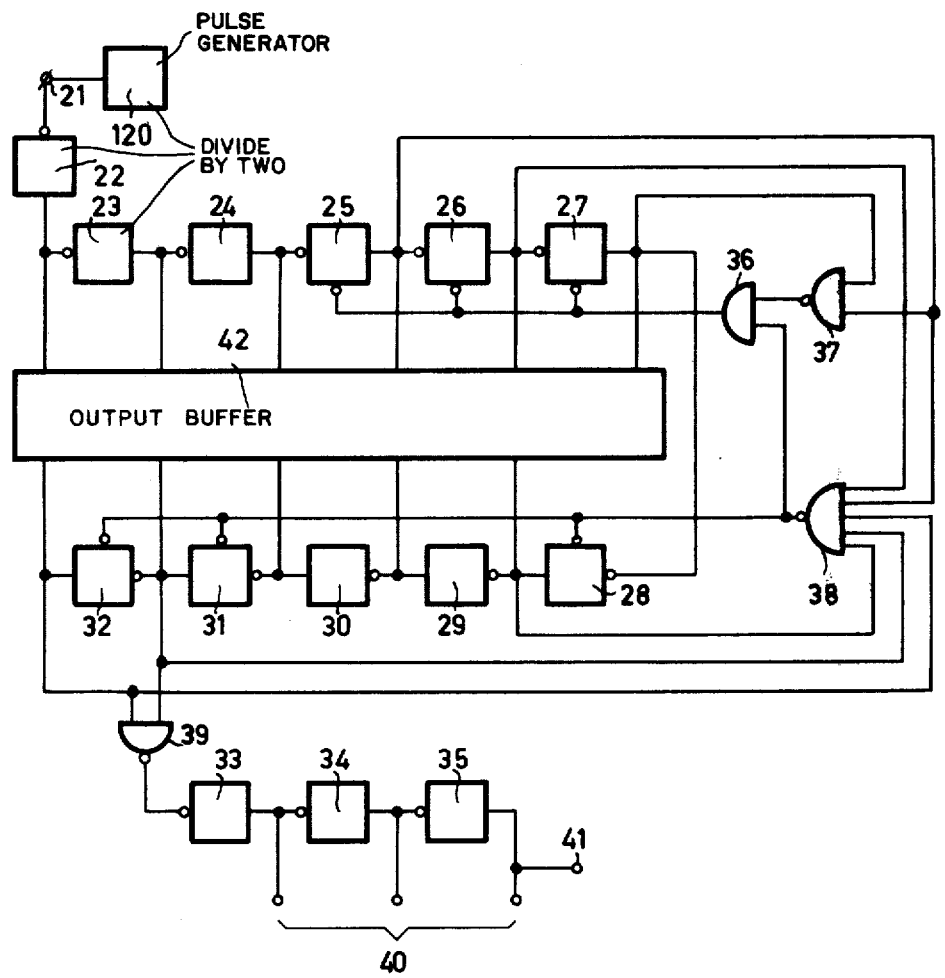
FIG. 7 shows a counter comprising various sub-cycles for producing, in synchronism with the clock cycles of the foreground memory, a character-on-the line plus line number address.

FIG. 7 in this respect shows a counter which also belongs to the interface 14 of the background memory 3 (FIG. 2). This counter counts in synchronism with the rotation of the rotary magnetic field in order to update the "position" of the data in the background memory and, moreover, to convert the linear counting position into a page number, line number and character number. In case of a CCD background memory, synchronization would exist with the clock driver for the charge transfer cells. The counter counts through 8192 counting pulses during one cycle, and comprises 14 divide-by-two devices 22–35, an AND-gate 36, and three NAND-gates 37, 38, 39. The counting pulses on the terminal 21 are supplied by the pulse generator 120, each time in a predetermined phase of the rotary field. The rotary field is produced by two generators providing sinusoidal currents, and the pulses can be derived from such a current. In the starting position, all divide-by-two devices supply the value "0". The divide-by-two devices 22, 23, 24 act as a divide-by-eight device. The divide-by-two devices 25, 26, 27 act as a divide-by-five device. When these devices supply the data 1, 0, 1, respectively, the NAND-gate 37 receives two logic "1" signals for the first time and supplies, via the AND-gate 36, a logic "0" for resetting the divide-by-two devices 25, 26, 27 to the zero position. Due to the resetting of the divide-by-two device 27, the divide-by-two device 28 advances to the next position, i.e. to the "1" position in this case. The divide-by-two devices 22 to 27 thus count in accordance with a sub-cycle of forty counting pulses (i.e. the number of characters on a line). Furthermore, when the divide-by-two devices 28, 31, 32 reach the "1" position (the decimal counting position of this group of divide-by-two devices is then 25), and the divide-by-two devices 25, 26, subsequently supply a "1" signal, the NAND-gate 38 receives five logic "1" signals and directly supplies a reset signal to the divide-by-two devices 28, 31 and 32 and via the AND-gate 36, a reset signal to the divide-by-two devices 25, 26, 27 (in this case, this is superfluous for the divide-by-two device 27, but double use is thus made of the gate 36). The 1—1 output data of the divide-by-two devices 31, 32 were supplied to the divide-by-two device 33 shortly before that instant, via the AND gate 39, in order to raise the position of the divide-by-two networks 33, 34, 35 by one. The divide-by-two devices 28–32 thus count in accordance with a counting cycle of 25 counting pulses, the series of divide-by-two devices 22–27, moreover, counting 24 counting pulses. A partial cycle of 25×40+24=1024 counting pulses is thus realized on the input 21, 960 pulses of said partial cycle relating to characters. The positions of the divide-by-two devices 28–32 and 27–22 are, moreover, each time supplied to the output buffer device 42. These positions thus also form the line or the character address on a display line for the display apparatus and can be supplied as such via the address bus line to the control device 2 or the register 16 in the foreground memory 6. The divide-by-two devices 33–35 count according to a counting cycle of eight counting pulses. The device 42 thus receives a five-bit line address for display and a six-bit character address on the line. The outputs 40 supply a three-bit page address. Counting pulses from the terminal 41 can also be used for incrementing a module counter when there are a plurality of modules of 8k words of eight bits. Further details of the device 41 will be described hereinafter.

Keyboard Control Device

Figure 8:
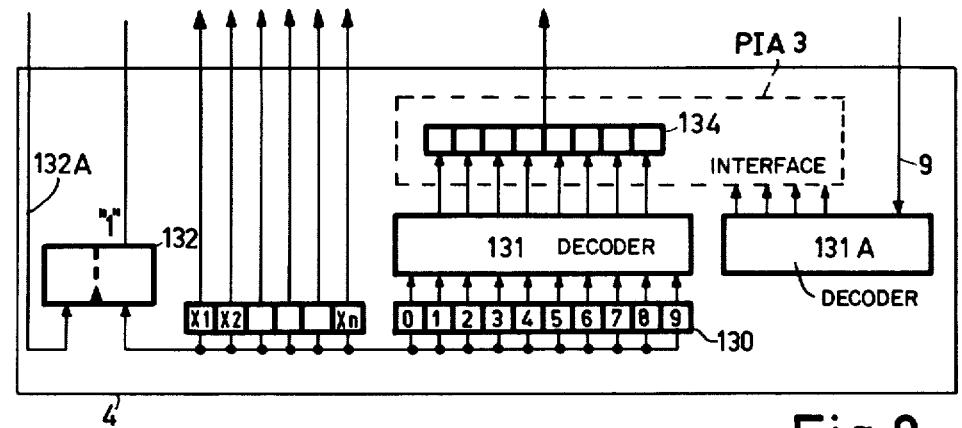
FIG. 8 shows a keyboard device.

The keyboard 4 (FIG. 2) has a simple construction. FIG. 8 shows a circuit diagram. The device comprises digit keys 0 . . . 9 and test keys x1 . . . xn. Actuation of a key sets the flipflop 132 to the "1" position. This "1" position informs the control device 2, via a line of the control bus line, that data are ready. Moreover, actuation of one or more digit keys causes the decoder 131 in the register 134 to form a binary code for output via the multiple bus line 8. The keys x1 . . . xn are test (function) keys which directly prepare a quantity of data for one or more conductors of the control bus line. The keyboard is connected via an interface for peripheral apparatus (PIA 3) which corresponds, for example, to the unit 152 of FIG. 9 as far as construction and connection are concerned. There is also provided a decoder 131A which is connected to the address bus line 9 and which, upon reception of one or more predetermined address codes, supplies an enabling signal for the element PIA 3. The latter operates as an address position in the address space of the microprocessor and can produce the data in the register 134 on the line 8 when addressed. The resetting of the flipflop 132 is effected by a signal from the control device on the line 132 A.

The control device 2 comprises a known microprocessor of the type MOTOROLA M 6800 which is not separately shown in a Figure. The two eight-bit output address buffers of this microprocessor are connected, parallel to the address bus line 9, and the bidirectional 8-bit I/O data buffer is connected to the data bus line 8. The microprocessor furthermore comprises an "instruction decoder and test unit" which is connected on the one side to the instruction register and on the other side to external control lines. In as far as they are used, these control lines form part of the control bus line which is connected, parallel to the address bus line 9, to further parts of the device.

In accordance with the specification of said microprocessor, there are the following input lines: the first clock pulse line and the second clock pulse line are connected to the lines 111 and 103, respectively, of FIG. 3. The reset line serves to set the program in the microprocessor to a starting position. On the non-masked interrupt line a signal can be generated when a measuring element (not shown) detects that the output voltage of a power supply source for the other parts is too low. This interrupt signal has the highest priority. The "stop" line is not used in this application of the microprocessor, because a rest signal is present thereon. The data receiver 1 and the keyboard can generate a signal on the interrupt line which can be masked. This interrupt can be masked by the former interrupt and then becomes inactive; in other cases an internal data transport or address transport can thus be generated. The output address lines of the microprocessors are terminated by a high impedance by a signal on the three-state control line; this is also applicable to the read/write control line yet to be described. The microprocessor can thus be sidelined as an active element, so that the "direct memory access" (DMA) yet to be discussed is facilitated, i.e. between background memory and foreground memory. The data buffer of the microprocessor is terminated by a high impedance by a signal on the data bus enable line in order to realize sidelining, Furthermore, the microprocessor comprises the following output lines which are connected to the control bus line: the address bus enable line. A signal thereon indicates that a data signal for output is available in the data output buffer of the microprocessor. The validity line for an address indicates whether or not a valid memory address is available in the address output buffer. The read/write line 151 indicates whether the microprocessor is in the read or in the write phase.

The control device furthermore comprises a program memory (not separately shown) which has a capacity of 3 kilobytes and which is connected parallel to the address bus line and data bus line and, if applicable, to the control bus line. This memory may be constructed as a read only memory and serves for the storage of program steps and special standard messages for display to be described hereinafter. Finally, the control device comprises a processing memory (not separately shown either) which has a capacity of 256 bytes (¼ kilobyte). This memory is constructed as rewritable memory and serves for the storage of one or more variables (for example, an intermediate address, a position of the program counter of the microprocessor, a data word for delayed output along the data bus line, etc). The introduction of such a microprocessor permits a variety of functions which, however, are not specifically described because they do not relate to the invention which mainly concerns the organization of and the cooperation between the foreground memory and the background memory.

The Interface

For the description of the address counter of FIG. 7, reference has already been made to the interface 14. This interface serves to control the data transfer from and to the background memory, notably in view of the serial organization thereof.

Figure 9:
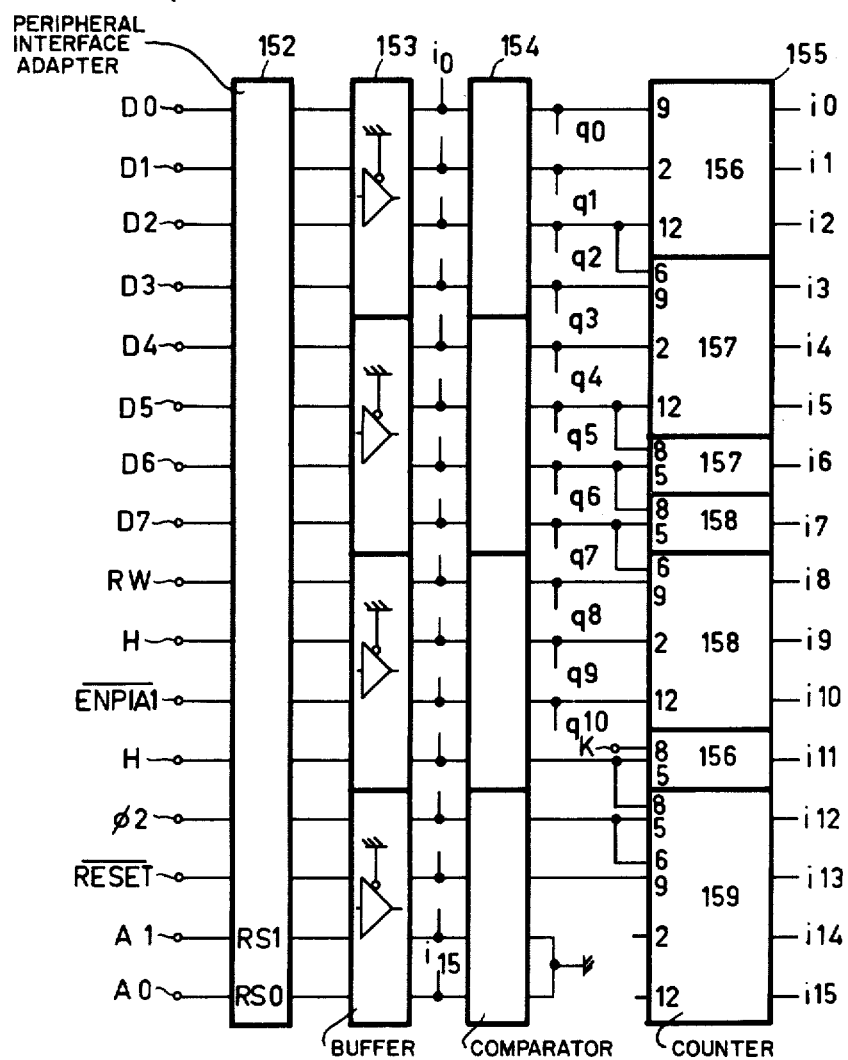
FIG. 9 shows an arrangement of a peripheral interface adapter, a 16-bit buffer stage, a 16 bit comparator and a presettable counter for connecting the interface unit of the background memory to respective connections of the data bus, address bus and control bus.

FIG. 9 shows an input stage for this interface, The element 152 is of a type as described for the keyboard member and is known as a "peripheral interface adapter" or PIA, make MOTOROLA MC 6820. The element 152 comprises sixteen inputs, the first eight of which are connected to the lines of the data bus line 8 for receiving the relevant data bits DO-7; D7 has the highest significance level. The next eight inputs of the element 152 (PIA 1) successively receive the signals RW (may be generated on the one hand by the line 151 of the microprocessor as described, and on the other hand also internally by the interface), $\overline{\text{ENPIA}}$ 1 (see hereinafter), H (two times, fixed high signal), $\phi 2$ (clock pulse as described), $\overline{\text{RESET}}$ (of 2; the inverted value thereof is active in this case), and finally A1, A0 which are the two least significant bits of the address bus line 9. The effect of the signals inside the element 152 is similar. Furthermore, the signals H", H' and $\overline{\text{ENPIA}}$ 1 act as selection (enable) signals. In this simple version, only one bit is concerned, because the other two bits are constant. In a more elaborate version, the background memory may have an eight-fold capacity (64 pages in eight modules), comprising a corresponding numb;er of devices 152 which can then be selected by a three-bit signal on these three terminals. The clock signal $\phi 2$ acts as an enable signal. The bit signal A1 internally acts as the signal RS1, i.e. as part of the input/output selection. In this version (see type number), the element 152 comprises two substantially identical halves, the value of RS1 always selecting one of the two halves. The bit A0 internally acts as the signal RS0, this signal for each half activating the registers whereby the element 152 is controlled with respect to control register or data register.

The element 153 is a 16-bit buffer stage, the internal construction of which is shown in the form of a symbol once per four bits. The type number is TEXAS INSTRUMENTS 74125. Proceeding from the top downwards, the sixteen outputs of the element 153 supply output signals to on the one side the sixteen inputs of the quadruple fourbit comparator 154 (TEXAS INSTRUMENTS 7485) and on the other side in the same sequence to the sixteen inputs i0 . . . i15 of the presettable counter 155. This counter performs the same function as the counter shown in FIG. 7 which therein consists of 14 counting stages. In this alternative realization, it successively consists of a presettable binary (dividing) counter 156 (TI 74-LS-197), see also the twelfth bit position; a further presettable binary counter 157 (type TI 75-LS-196); and two further presettable binary counters 158, 159 of the former type. A number of counting stage outputs, each time indicated by the numbers of their connection pins, are connected to the next outputs for forming the relevant sub-cycles and partial cycles. The last two bit outputs of the element 159 are not interconnected as shown for the stated storage capacity of 8 pages in the background memory, but can be used when this capacity is increased. The eleven least-significant bit outputs of the counters supply the bit signals q0 . . . q10 which will be described hereinafter.

Figure 10:
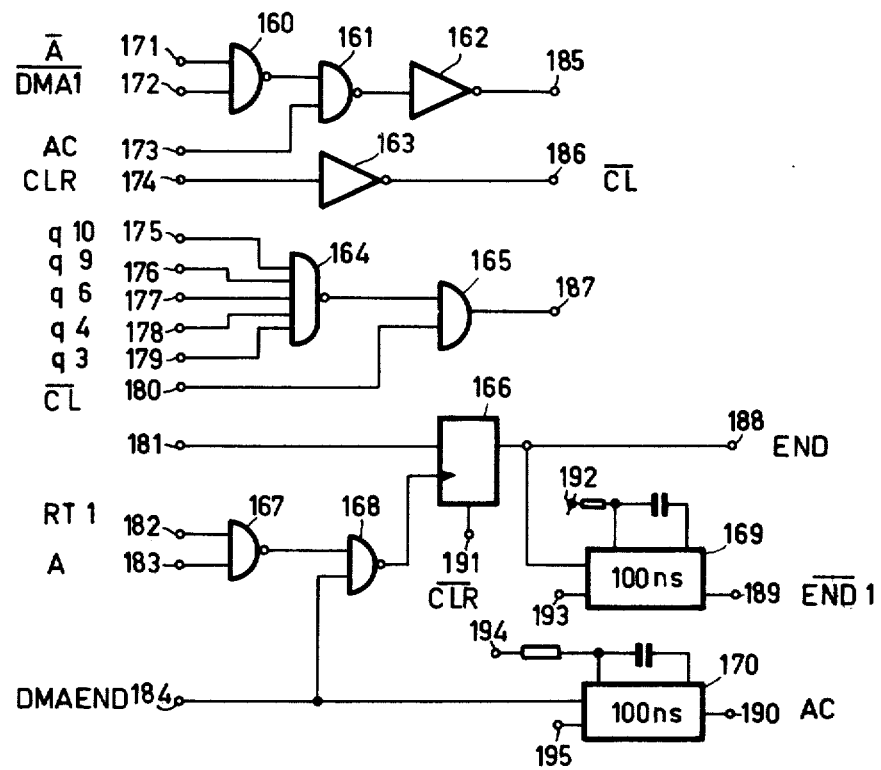
FIG. 10 shows further elements of the interface unit of the background memory for resetting, loading and clearing the presettable counter thereof.

FIG. 10 illustrates the formation of a number of control signals for the circuit shown in FIG. 9 and the extraction of some signals therefrom. Cross referencing is used to refer to later Figures. The input 171 receives the signal $\overline{A}$ (see FIG. 12). The input 172 receives the signal $\overline{DMA1}$ (direct memory access); these two signals are applied together to the NAND-gate 160. The input 173 receives the signal AC originating from the terminal 190 (see hereinafter), and this signal is applied, together with the output of the gate 160, to the NAND-gate gate 161. Via the inverter 162, the output signal of the gate 161 reaches the output 185 which is connected (not shown) to the connection pin "6" (stated by manufacturer) of the element 156 of FIG. 9. Input terminal 174 receives a signal CLR (clear) with is supplied to the terminal 186 via the inverter 163. This terminal thus supplies the signal $\overline{CL}$ which is supplied as a reset signal to the "13" connection pins of the elements 156, 159 of FIG. 9. The numbered connection pins are described in the specification of said elements. The signal CLR is extracted from the element 227 in FIG. 12 and is thus delayed by a small interval. The terminals 175 to 179 receive the signals q10, q9, q6, q4, q3, respectively, from the counter in the manner shown in FIG. 9, analogous to the gate 38 of FIG. 7. These signals are supplied, together with the signal $\overline{CL}$ from the terminal 186, to the AND-gate 165, via the NAND-gate 164. On the terminal 187 of the AND-gate 165 a signal appears which is supplied to the "13" connection pins (see terminal 185) of the elements 157, 158 of FIG. 9. Furthermore, the connection pin "1" of all elements 156, 157, 158, 159 receives the signal LD (load) which controls the presetting and which is obtained, via an inverter (not shown), from the signal LAC (load address counter); the latter signal will be described with reference to FIG. 11. The terminal of the element 156 which is denoted by the reference K receives the result of the signals q9, q10, analogous to gate 39 of FIG. 7, which is obtained via an AND-function. This signal K acts as a clock signal for counter 156. The "6:" connection pin of the interconnected (quadruple) comparators 154 is supplied to the data input of the flipflop 166 via the terminal 181 (TI 7474). This signal indicates that the same position has been reached in both registers. It may be used to signal that a direct memory access as regards the background memory (DMA) has been completed. It can alternatively be used for signalling that the rotation (ROT) of the data in the background memory has reached a preset position (independent of the said DMA function). The clock input of the flipflop 166 receives, via the NAND-gates 167, 168, the signals: RT1 on the terminal 182 (rotate) which is generated by the device shown in FIG. 2; A on the terminal 183 which is generated by the device shown in FIG. 12; DMAEND on the terminal 184 which is generated by the circuit shown in FIG. 13. The latter signal indicates that an elementary operation of the direct memory access—transfer of a single data word—has been terminated in view of the difference in the bit frequency of the foreground memory and the background memory. The flipflop 166 is reset by the signal $\overline{CLR}$ (clear) on the terminal 191 of the output of the element 226 of FIG. 12. The output signal END on the terminal 188 is also supplied to the monostable multivibrator 169 (type TI 74123). According to the specification issued by the manufacturer, this element, having an external capacitance of 330 pF and an external resistance of 4.7 Kohms, has an astable time of 100 ns. The terminal 192 is continuously at a "high" level, which is a supply potential of approximately 5 volts in this case. The "high" signal potential on the input signal terminals is at least 2.4 volts. The terminal 193 is continuously at a "low" potential, which is maximum 0.8 volts. Thus, the pulse-shaped signal $\overline{END1}$ appears on the terminal 189, said signal being accompanied by a change in the signal END on the terminal 188. The monostable multivibrator 170 is similarly connected and forms the signal AC on the terminal 190 during an astable period of 100 ns.

Figure 11:
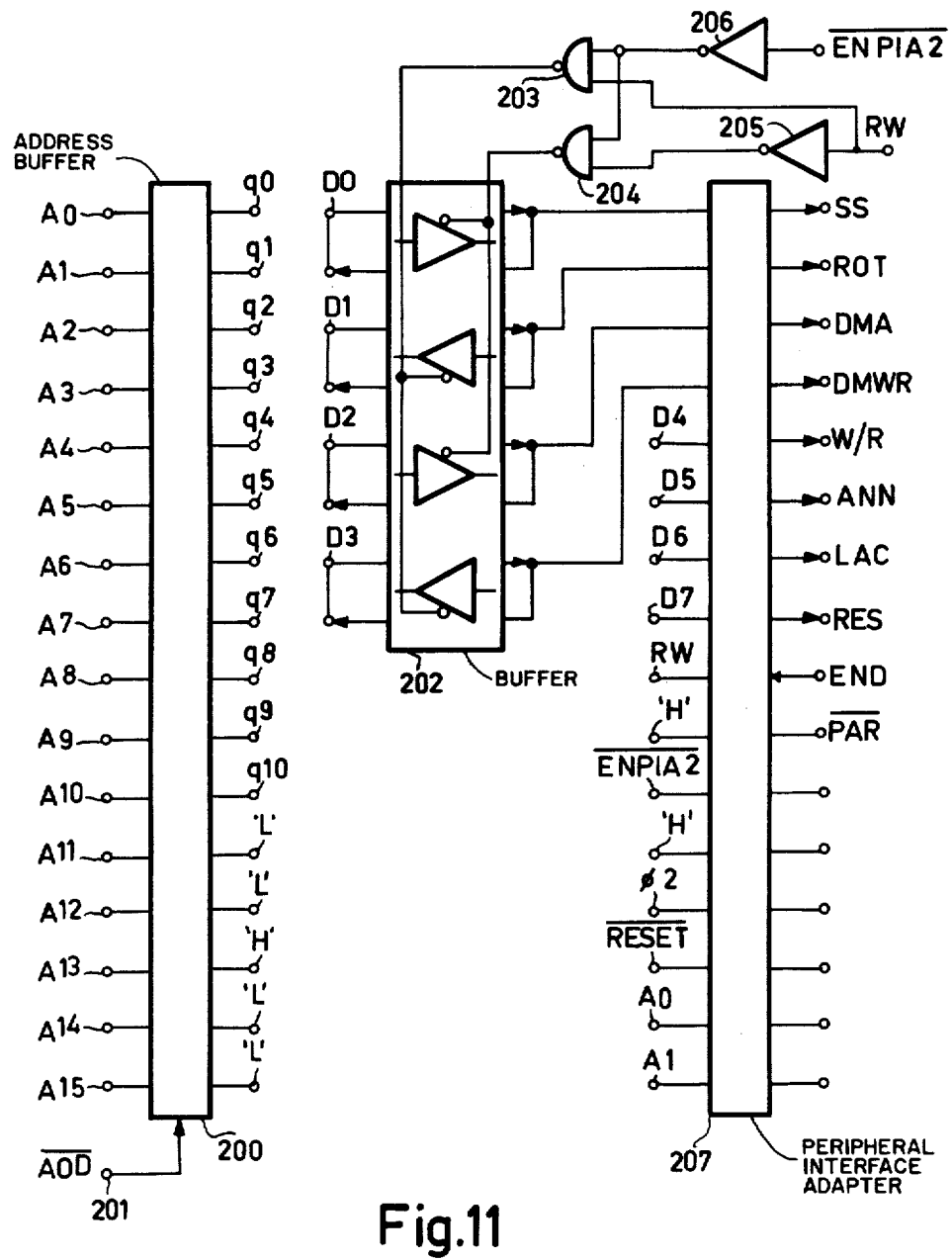
FIG. 11 shows further elements of the interface unit of the background memory for connecting the presettable counter thereof to the address bus, and furthermore for generating a plurality of respective mode signals.

The interface 14 furthermore comprises the following components, which are shown in FIG. 11. The element 200 has a construction which is similar to that of the element 153 of FIG. 9. The outputs thereof are connected to the address bus line conductors and supply the 16 address bits which increase in significance from A0 to A15. The control terminals of the three-state buffer (high, low, and terminated via a high impedance), connected to ground potential in the element 153 as indicated, then receive the common control signal $\overline{AOD}$ on the terminal 201, which indicates that an address is to be generated for direct memory access. When this signal is high, the said high-impedance state occurs. The sixteen primary connections receive the output bits q0 . . . q10, respectively, from the relevant outputs of the address counter 155 of FIG. 9. The last five connections of the element 200 carry the indicated "high" and "low" values. This rather arbitrary bit combination indicates the address of the foreground memory on the address bus line 9 as it appears in the address space of the control device 2.

The element 202 is a bidirectionally connected buffer which is formed like the elements 153, 200. This buffer each time receives the data bits D0–D3 on four inputs, and outputs these bits on the secondary side. The activation of the one or the other conducting direction is realized by the output signals of the NAND-gates 203,204. The element 202 thus consists of two four-bit three-state buffers, the bit channels being connected each time one opposing the other. The gates 203, 204 are controlled directly and via the inverter 205, respectively, by the signal RW which controls a read/write mode. The signal $\overline{ENPIA2}$ then appears as a selection signal which is applied in parallel via the inverter 206 (see also hereinafter for the signal $\overline{ENPIA2}$). The construction of the element 207 corresponds to the interface for peripheral apparatus PIA 152 of FIG. 9. The first eight connections carry the data signals D0–D7. The introduction of a buffer in the least-significant four stages enhances the fan out of the associated signal sources.

As is indicated, the further terminals to the left of the element 207 carry exactly the same signals as the corresponding terminals of the element 152 of FIG. 9, with the exception of the signal $\overline{ENPIA2}$ which controls the selection in conjunction with the adjacent two "high" signals. The signals $\overline{ENPIA\ 1,2}$ can be derived from an address formed in the control device 2.

The following signals are supplied to the secondary side of the element 207:

SS (single step) for controlling a single rotary field period for the background memory; ROT for permitting the activation of the rotary field coils; DMA for controlling a direct memory access; DMWR, a logic "0" indicating that the transfer during this direct memory access is effected from the background memory to the foreground memory; W/R, where in the case of said "single step" (SS) a logic "0" indicates that data transfer is effected from the background memory to the foreground memory; ANN for generating an annihilation signal for a magnetic domain; LAC for controlling the loading of the address counter 155 of FIG. 9 (after inversion to signal LD); END whereby the end of a memory transfer is signalled (terminal 188 of FIG. 10), or the end of a rotation at corresponding address data; $\overline{\text{PAR}}$, a logic "0" indicating an even parity between the eight data bits, as has already been stated. The last six connections are not used.

Figure 12:
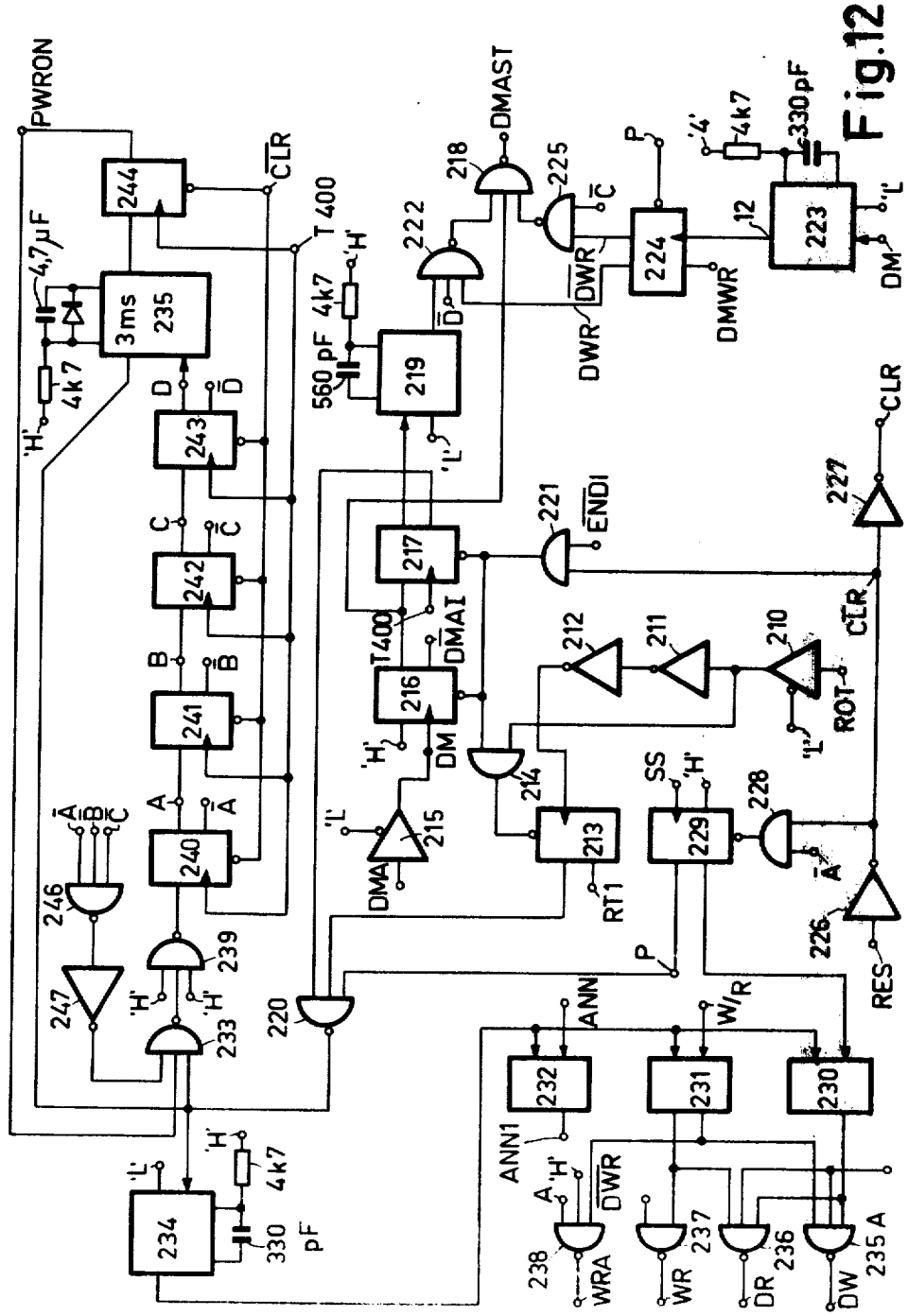
FIG. 12 shows further elements of the interface unit of the background memory for developing specific drive and control signals for magnetic bubble arrangement therein.

FIG. 12 shows further parts of the interface. The element 210 forms part of a multiple three-state buffer (see, for example, the element 153) and constitutes a non-inverting element for the signal ROT, co-controlled by a signal "L" on the control input. The output signal is applied, via a series connection of two inverters 211, 212, in order to introduce a delay, to the clock input of the flipflop 213 which continuously receives a "high" signal on its data input. The signal of the element 210 is furthermore supplied to the AND-gate 214, the output of which is connected to the reset input of the flipflop 213. The signal DMA of FIG. 11 is supplied to a non-inverting circuit 215 which corresponds to the element 210 and which supplies the signal DM. This signal is supplied to the clock input of the flipflop 216 which continuously receives a "high" signal on its input. The inverted output signal of the flipflop 216 produces the signal $\overline{\text{DMA1}}$ which is supplied to the terminal 172 of FIG. 10. The non-inverted output signal of the flipflop 216 is supplied to the data input of the flipflop 217 and to the NAND-gate 218. The clock input of the flipflop 217 receives a clock signal T400 having a frequency of 400 kHz. The first output of the flipflop 217 is connected to the first input of the monostable multivibrator 219. The second input thereof continuously receives a "low" signal and has a time constant of 1 ms as a result of an additional capacitor of 560 pF and a resistor of 4.7 kohms which is continuously connected to a high power supply potential. The second output of the flipflop 217 is connected to an input of the NAND-gate 220. The flipflops 216, 217 can be reset by the output signal of the AND-gate 221 which is also applied to the AND-gate 214 in order to produce the reset signal for the flipflop 213. The output signal of the monostable multivibrator 219 is supplied to the NAND-gate 222. This gate furthermore receives the signal $\overline{\text{D}}$. The signal DM is supplied to the first input of the monostable multivibrator 223. The second input thereof continuously receives a "low" signal and has an astable time of 100 ns as a result of a resistor of 4K ohms which is connected to the supply voltage of 5 volts, and a capacitor of 330 pF. The signal on the "12" connection pin of element 223 is connected to the clock pulse input of the flipflop 224 which receives the signal DMWR from the element 207 on its data input. This flipflop is reset by the signal P which is supplied by the flipflop 229 as will be described hereinafter. The non-inverted output of the flipflop 224 produces the signal DWR which is supplied to the NAND-gate 222 and to the circuit shown in FIG. 13. The inverted output of the flipflop 224 is also supplied to the circuit shown in FIG. 13 as the signal $\overline{\text{DWR}}$ and to the NAND gate 225, the other input of which receives the signal $\overline{\text{C}}$. The output signals of the gates 222 and 225 are supplied to the NAND-gate 218 which thus supplies the signal DMAST which is supplied to the circuit of FIG. 13. The inverter 226 receives the signal RES which is supplied by the device 207 of FIG. 11 and which serves to generate a starting condition. The inverter 226 supplies the signal $\overline{\text{CLR}}$ which comprises pulse edges which are defined better then those of the signal RES, and also than those of the signal CCR subsequently supplied by the inverter 227. The latter signal is supplied to the circuit shown in FIG. 10. The signal $\overline{\text{CLR}}$ is supplied to the AND-gate 221 which also receives the signal $\overline{\text{END1}}$ from the terminal 189 of FIG. 10; the output signal of said AND-gate has already been described. The signal $\overline{\text{CLR}}$ is also supplied to the AND-gate 228, the other input of which receives the signal $\overline{\text{A}}$, the output signal of said gate being used as a reset signal for the flipflop 229. The data input of the latter flipflop continuously receives a "high" signal, while its clock input receives the signal SS from the element 207 of FIG. 11. The inverted output of the flipflop 229 supplies the signal P, inter alia to the NAND-gate 220. The non-inverted output signal of the flipflop 229 is used as input data for the element 230. The elements 230, 231, 232 form part of a 4-bit shift register having a parallel input, type TI 74195. The input data of the element 231 consist of the signal W/R from the element 207 of FIG. 11. The element 232 receives the signal ANN as its input data from the element 207. The signal from the NAND-gate 220 is supplied to the NAND-gate 233 and to the monostable multivibrators 234, 235. The other input of the monostable multivibrator 234 is connected to a signal which is constantly "low", and has a time constant of 100 ns, obtained by way of a resistor of 4.7K ohms and a capacitor of 330 pH in the already described manner. The output signals of the multivibrator 234 act as control signals for the elements 230, 231, 232. The first output signal of the element 230 is applied to the NAND-gate 235A. The first (non-inverted) output signal of the element 231 is supplied to the AND-gates 235A, 238. The second output signal of the element 231 is supplied to the NAND-gates 236, 237. The first output signal of the element 232 produces the signal ANN1. The signal $\overline{\text{DMA1}}$ (supplied by the flipflop 216) is supplied to the NAND-gates 235A, 236. The signal $\overline{\text{DWR}}$ (supplied by the flipflop 224) is supplied to the NAND-gate 237. The signal A (see hereinafter is supplied, together with a continuously "high" signal, to the NAND-gate 238 (type TL 7410). The gate 235A thus supplies the signal DW, the gate 236 supplies the signal DR, the gate 237 supplies the signal WR, and the gate 238 supplies the signal WRA. The signal WR indicates the writing in the background memory during a rotary field period as described with reference to FIG. 5. The signal WRA is supplied to the circuit shown in FIG. 13. The signals DW and DR indicate the writing and the reading, respectively, in the background memory during a rotary field period in as far as an operation with direct memory access is concerned. The NAND-gate 246 receives the inverted output signals of the flipflops 240, 241, 242. The output signal of this gate 246 is supplied, after inversion in the element 247, to the NAND-gate 233 which furthermore receives the signal PWRON from the element 244. The output signal of the gate 233 is supplied, together with two continuously "high" signals, to the NAND-gate 239 which thus only acts as an inverter. The output signal of the gate 239 is supplied to the data input of the flipflop 240. The flipflops 240, 241, 242, 243 form a ring counter. This non-inverted outputs carry the signals A, B, C, D, respectively, and are connected, if applicable, to the data input of the next flipflop. The clock inputs receive a clock frequency of 400 kHz; T 400, which will be described hereinafter. The signal $\overline{\text{CLR}}$, formed by the inverter 226 in the described manner, acts as the reset signal. The flipflops supply the signals A ... D and $\overline{\text{A}}$ ... $\overline{\text{D}}$. The non-inverted output signal of the flipflop 243 is supplied to the second input of the monostable multivibrator 235. As a result of connection to a continuously "high" signal, a resistor of 4.7 K ohms, a capacitor of 4.7 microF, and a diode, this multivibrator has a time constant of approximately 3 ms. The output signal of the monostable multivibrator 235 is supplied to the data input of the flipflop 244. The clock input thereof receives the said signal T 400 and is reset, together with the flipflops 240-243, by the signal $\overline{CLR}$. The output signal of the flipflop 244 supplies the signal PWRON which indicates the excitation condition of the rotary magnetic field coils. If this signal is "low", the retriggerable monostable multivibrator is not reactivated within 3 ms, so that no access to the background memory is requested for this period; in order to reduce the dissipation, the excitation of the rotary magnetic field is then stopped. The period of 3 ms is rather arbitrary. Said access may concern a single step memory access or a direct memory access, so the 3 ms time interval is situated between the granting of a first access and the request for a subsequent access. All elements of FIG. 12 have now been described.

Figure 13:
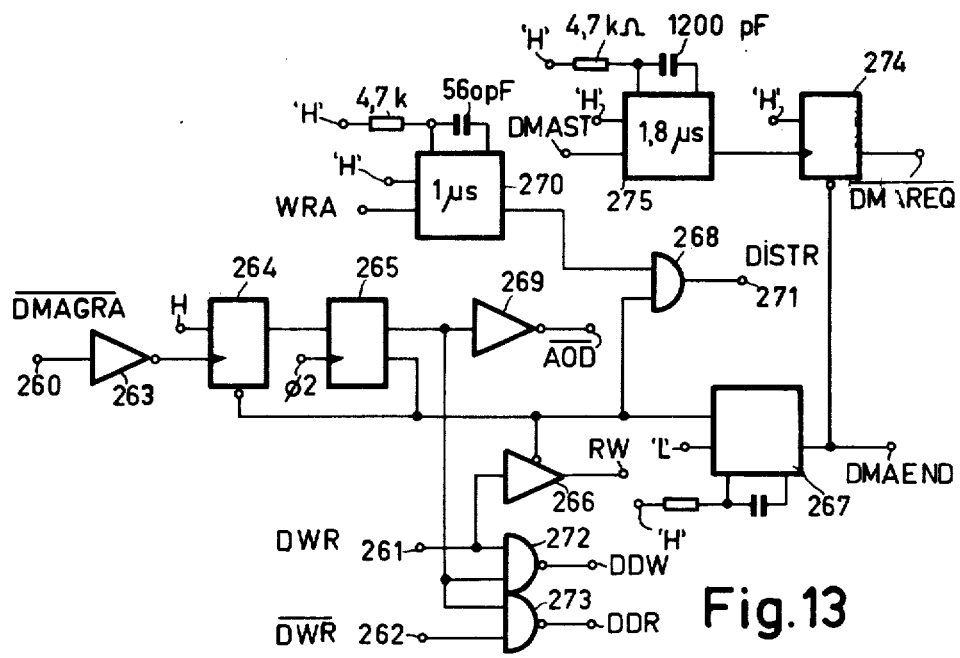
FIG. 13 shows further elements of the interface unit of the background memory for adapting the operation of the background memory to the operating mode of the data bus.

FIG. 13 shows some further parts of the interface unit. The signal $\overline{DMAGRA}$, generated by the microprocessor and indicating that direct memory access is permissible after a relevant request, for example, from the keyboard device, appears on the input 260. The microprocessor then surrenders control as far as this memory access is concerned, access being further controlled by the circuits elaborated at the gate level. The signal is supplied, via the inverter 263, to the clock input of the flipflop 264, the data input of which receives a continuously high signal. The non-inverted output of the flipflop 264 is supplied to the data input of the flipflop 265 which is clocked by the said clock pulse $\phi 2$ having a frequency of 1 MHZ. The inverted output signal of flipflop 265 is supplied to the reset input of the flipflop 264, the control input of the circuit 266 for conduction in non-inverted form, the first input of the monostable multivibrator 267, and the AND-gate 268. The non-inverted signal of the flipflop 265 is supplied to the inverter 269, the output of which supplies the signal $\overline{AOD}$. This signal is supplied to the element 200 of FIG. 11, with the result that this element supplies the bits q0 . . . q10 and the five fixed signals as an address on the address bus 9. The signal WRA is supplied to the second input of the monostable multivibrator 270, the first input of which receives a continuously "high" signal. By way of a resistor of 4.7 K ohms and a capacitor of 560 pF, this multivibrator has an astable period of 1 ms. The output signal thereof is supplied to the AND-gate 268. This gate generates the signal DISTR (data input strobe) on the output 271 to realize synchronization during the writing in the input data register of the interface unit and the subsequent activation of the bubble generators. The monostable multivibrator 267 receives a continuously "low" signal on its second input and has an astable period of 100 ns due to a resistor of 4.7 K ohms and a capacitor for 330 pF. The output pulses are supplied as the signal DMAEND, after each word transferred (character code), to the terminal 184 of FIG. 10. The terminal 261 receives the signal DWR from the flipflop 224 of FIG. 12; the terminal 262 receives the inverted value $\overline{DWR}$ thereof. The non-inverted output signal of the flipflop 265 is not only supplied to the inverter 269, but also the the NAND-gates 272,273. Cocontrolled by the signals DWR, $\overline{DWR}$, these gates supply the signals DDW and DDR, respectively. These signals indicate whether the data bus (8) is in the write or the read mode as regards the direct memory access. (DMA). The circuit 266 for non-inverted conduction then supplies a signal which acts to indicate the read of the write mode on the said control bus line. The signal DMAEND is supplied as a reset signal to the flipflop 274. The data input thereof continuously receives a "high" signal. The first input of the monostable multivibrator 275 receives a continuously "high" signal, and its second input receives the signal DMAST (start of direct memory access) from the gate 218 of FIG. 12. Due to the use of a resistor of 4.7 kohms and a capacitor of 1200 pF, the element 275 has an astable period of 1.8 ms. The inverted output signals of the monostable multivibrator are supplied to the flipflop 274 as clock pulses. The inverted output thereof supplies a signal $\overline{DMAREQ}$ (REQ=request), so that each time a renewed request for continuation of the direct memory access is signalled (see FIG. 15). The circuit of FIG. 13 has now also been described.

The interface units for peripheral apparatus (PIA 207, 152 of the FIGS. 8, 9, 11) of the described system act as occupying four memory positions in the address space for the microprocessor, i.e. two memory (address) positions for data transfer and two further positions for control. In as far as they have not yet been described, the signals denoted by letters have the following meanings:

BMI: adaptation for background memory (background memory interface).
AC: address counter in the background memory which counts all rotary field periods.
AR: address register which contains the end position at which control of the rotary magnetic field stops.
ROT: this signal starts the rotary magnetic field until the position in AR is reached.
$\overline{ROT}$: this signal stops the generating of the rotary magnetic field.
DMA: this signal starts the direct memory access in the interface unit.
SS: (single step) this signal starts a single period of rotation of the rotary magnetic field.
END: this signal obtains the truth value if the address counter AC and the address register AR have the same position.
PAR: a signal from the interface unit which reaches the truth value if the detector device not shown (8 detectors in parallel) detects a word of even parity. The arrangement for generating the signal is not separately shown; it is composed in accordance with the known principle involving EXCLUSIVE-OR gates. This arrangement supplies a logic "1" each time when odd parity exists between its two inputs. Inversion of this "1" signals even parity.
MESS(i): sub-program which produces a message (i) on the display apparatus containing one of a number of predetermined texts.
WAIT(i): waiting for an action from the control member (keyboard), (i) indicating the cause (from a predetermined number of causes).

Figure 14A:
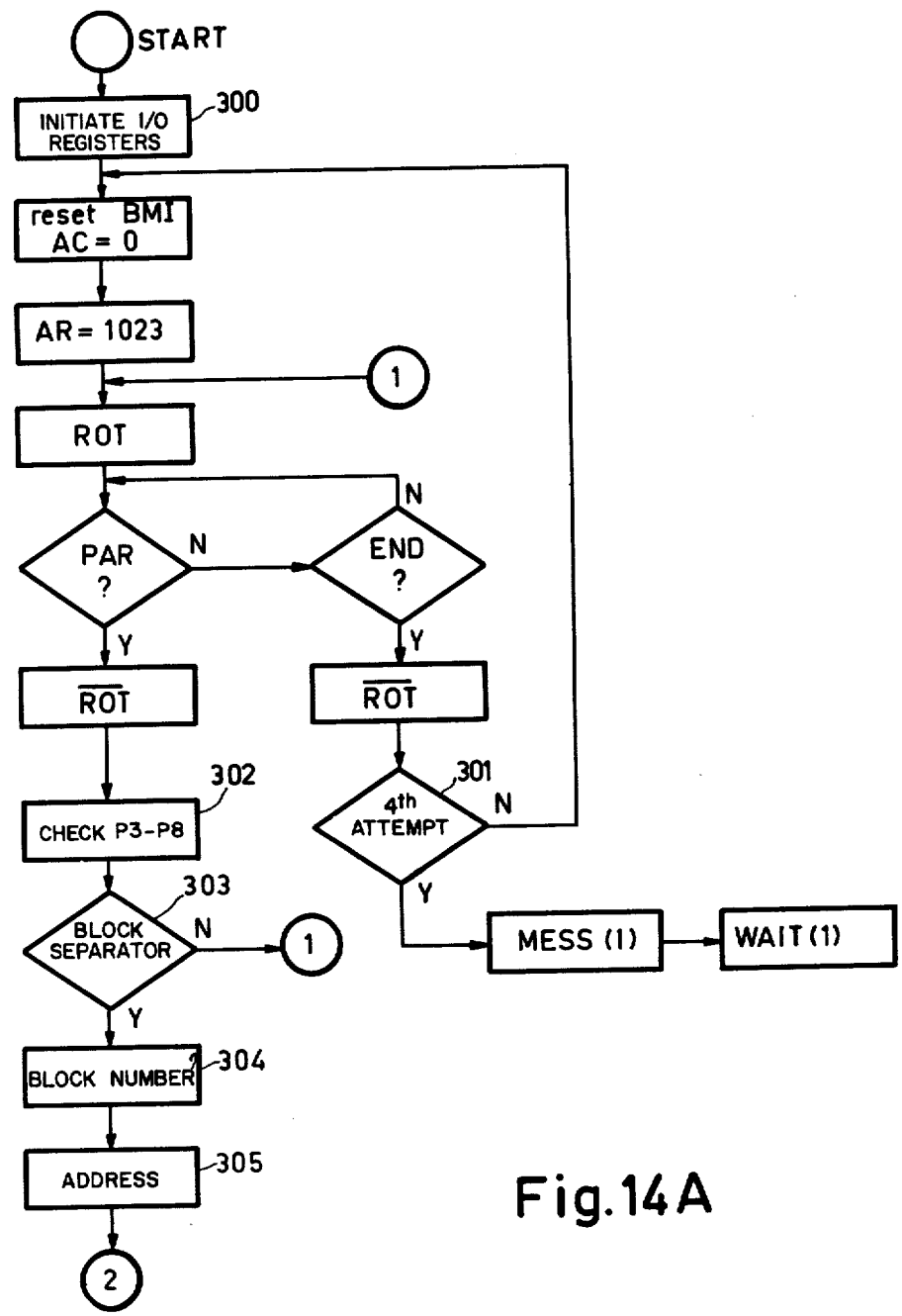
FIGS. 14A,B,C show a flow chart for the test of the background memory for the proper operation thereof.
Figure 14B:
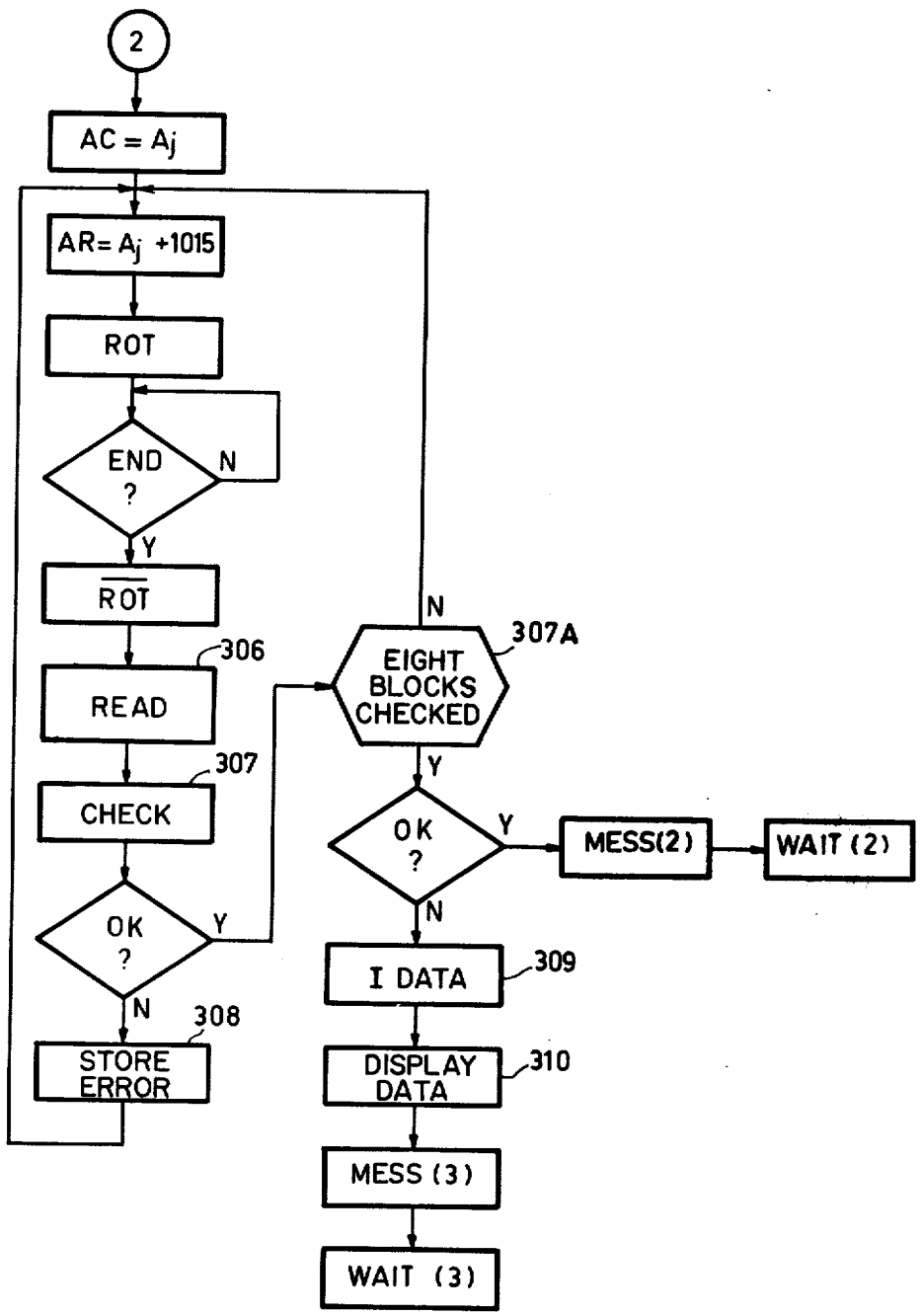
Figure 14C:
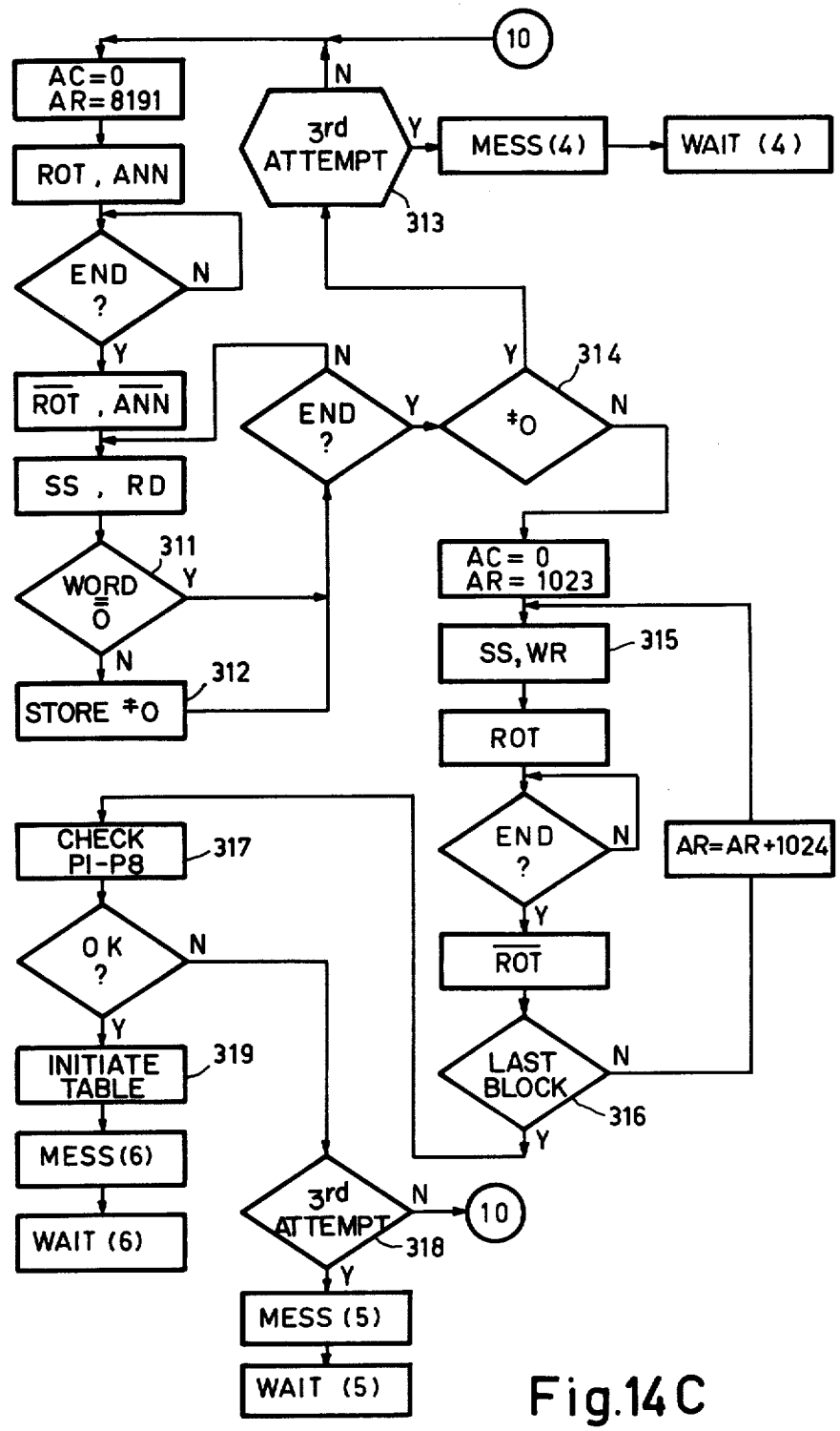

The FIGS. 14A, B, C shows a flow diagram of a test procedure for the background memory. Said test procedure may be executed either in a high security environment for proper protection of the data displayed with respect to bubble memory errors, or as a service method to check for malfunctioning. Usually, in domestic use such test methods would not be implemented. Several blocks have their meanings indicated, except for the following ones: 300: initiate I/O registers; 301: 4th attempt?; 302: check the contents of the words P3 . . . P8; 303: block separator?; 304: determine block number B j; 305: determine address Aj (in the background memory) associated with Bj; 306: read eight words P1 . . . P8; 307: check the contents P1 . . . P8; 307A: all eight blocks checked?; 308: store error in block Bj; 309 fetch the I data from each block j and store these data in the data table in the processing memory; 310: extract the display data D from block B1 by means of DMA and transport the data to the foreground memory; FIG. 14C shows the initiation of the background memory; 311: is word equal to zero?; 312: store which bit (bits) is (are) unequal to 0; 313: third annihilation attempt?; 314: check whether there are bits$\neq$0; 315: SS, WR for block Bj, pattern P1 . . . P8; 316: last block?; 317: check whether all P1 . . . P8 patterns are correct; 318: third write attempt? 319: initiate data table in the processing memory. FIG. 14A, B, C show the initiation and test of the background memory. After the display of MESS(6), the device is ready. Hereinafter, a list of standard messages is given:

MESS(1): The block headers are not detected
MESS(2): some block headers contain errors: block . . .
MESS(3): choose subject
MESS(4): annihilation not possible: chip . . .
MESS(5): it is not possible to initiate the bubble memory
MESS(6): bubble memory ready.

Figure 15A:
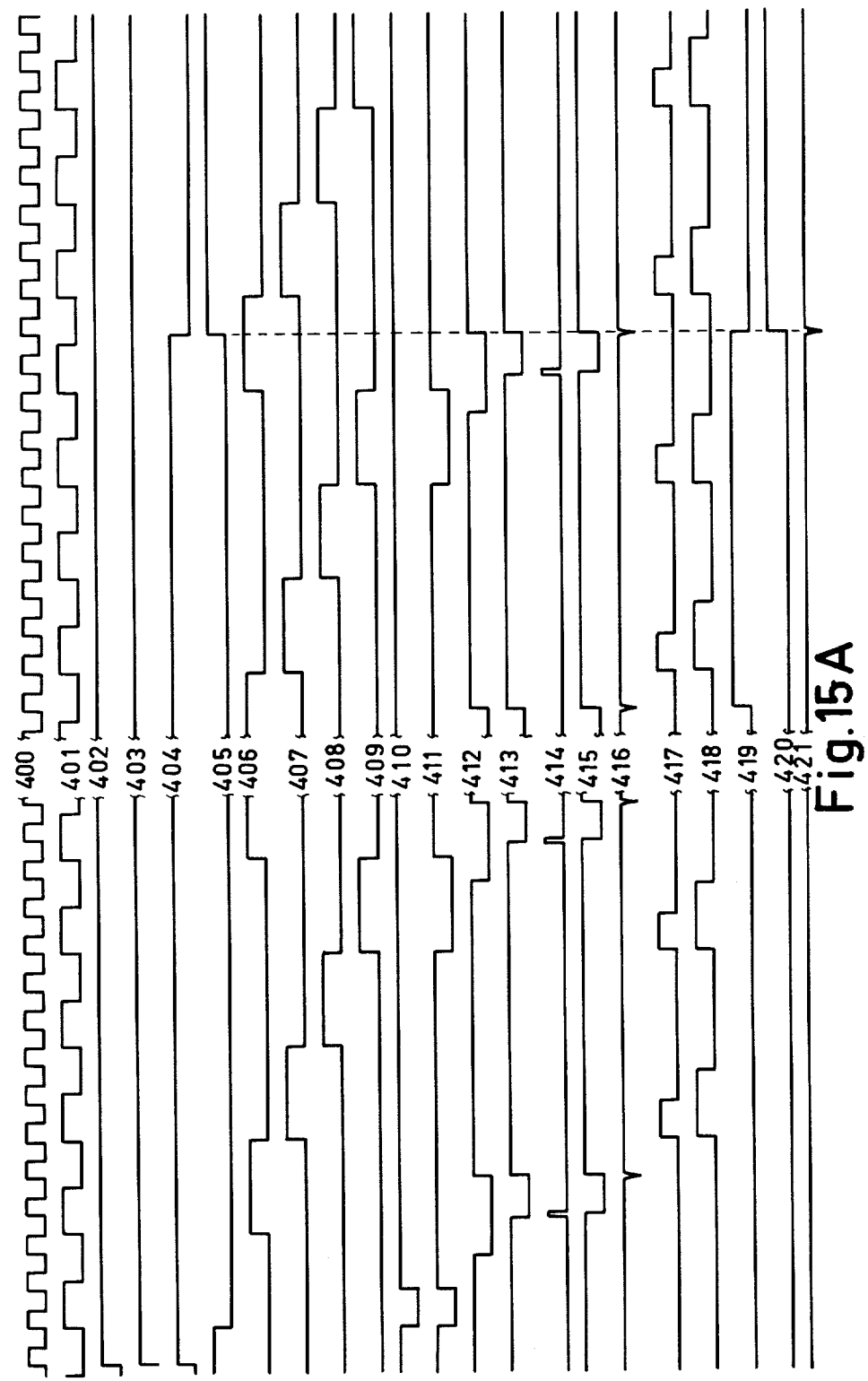
FIGS. 15A and B show a number of time dependent control signals for controlling a direct memory access to the background memory.

FIG. 15A shows a time diagram for the various signals in the case of a write operation in the background memory with direct memory access (DMA). The left half concerns the beginning, while the right half concerns the end of the access of one page. The line 400 supplies the clock pulse $\phi$ 2 having a frequency of 1 MHz. The line 401 shows an associated clock frequency of 400 KHz. The line 402 shows the signal DMA which is generated by the element 207 in FIG. 7 and which is impressed by the control device. The line 403 shows the signal DWR which is derived from the signal DMWR (element 207) and from the direction of the data transport. When the signal DMA appears, the signal DWR may change or remain the same. The line 404 shows the non-inverted output signal of the flipflop 216 of FIG. 12 which is set by DMA and which is reset by the signal $\overline{END1}$, thereby unblocking, and reblocking, respectively, the data transfer for the direct memory access to the background memory. Line 405 shows the inverted output signal of flipflop 217 of FIG. 12 which is controlled by a clock pulse of the T400 series. The lines 406–409 show the relevant signals A, B, C, D of FIG. 12 which cyclically recur under the control of the gate 220. Together their lengths cover one period of the background memory. Line 410 shows the output signal (inverted value) of the monostable multivibrator 219 of FIG. 12 which has a pulse length of 1 ms and which is started by the signal of line 405. This signal indicates the preparation of a character code by an external source. The line 411 shows the signal DMAST which produces a waveform, either under the control of the signal on the line 410 or in synchronism with subsequent $\overline{D}$ signals for the duration of the direct access. At the end of a D signal, a full rotary field rotation has been completed and, if applicable, a character code has been stored. The line 412 shows the signal $\overline{DMAREQ}$ which, in accordance with FIG. 13, is initiated by the signal DMAST each time after a delay of 1.8 microsecond and which is terminated by the signal DMAEND after each character transport. The line 413 shows the signal $\overline{DMAGRA(NT)}$ which is initiated by the signal on the line 412 after a delay of 1 microsecond and which is terminated simultaneously therewith. The line 414 shows the short-pulse-like signal on the non-inverted output of the flipflop 264 of FIG. 13 which is immediately reset. The line 415 shows the signal on the inverted output of the flipflop 265 which corresponds to the signals $\overline{AOD}$, DDW and DIST. Comparatively early at the beginning of a rotary field period, the character code is thus available for storage. The line 416 shows the pulse-like signal which is derived therefrom as DMAEND by the monostable multivibrator 267. The line 417 shows a signal which is alternately initiated by the pulses B and D and which serves to actuate the bubble generators of half the number of serial sub-memories (i.e. each time 4). Therefore, a two-way time multiplex occurs per period of the background memory. The reason is that the eight memory chips according to FIG. 5 are identical but half thereof are rotated over 180°, whereby they operate at a phase difference of 180°. The line 418 shows corresponding actuation signals for the annihilators of these serial sub-memories: these pulses have a length of 2 microseconds. The line 419 shows the signal 181 of FIG. 10 which indicates the reaching of the "last address", which further enables the reblocking. The line 420 shows the signal END (terminal 188 of FIG. 10) which becomes high under the influence of the next signal DMAEND. The line 421 shows the pulse-like signal $\overline{END1}$ (element 160) which is derived therefrom. After the latter signal, the signals on the lines 411, 412, 413, 414, 415, 416 remain unmodified until the next direct memory access.

FIG. 15B shows a time diagram of signals in the case of a read operation (non-destructive) in the background memory with direct memory access. Most signals correspond to those of FIG. 15A. However, the following characteristic differences exist. The signal on the line 403 has the other polarity, because now a read operation is concerned instead of a write operation, Therefore, the lines 417, 418 are omitted. A further difference consists in the fact that the data to be output become available for output only at the end of a rotary field period. Therefore, the signal on the line 410 is also omitted, like the first signal pulse on the lines 411, 414, 415, 416, 412, 413 which are still present. The pulses of the signal DMAST on the line 411 are synchronized by the signal C (gate 225 of FIG. 12). Therefrom, the pulses on the lines 412,416 are derived. The signal on the line 415 then indicates the inverted output of the flipflop 265 and the signals $\overline{AOD}$ and DDR; the pulse duration of 0.8 microsec. of the latter indicates the interval of the data output. Termination of the direct memory access in the right part of the FIG. is effected in the same way as in FIG. 15A.

What is claimed is:

1. A device for the simultaneous display of data in the form of a page on a display apparatus during a given time interval, comprising:
a data connection for receiving data signals;

a foreground memory having an input which is connected to said data connection and an output which is connected to an input of said display apparatus;

said foregound memory being adapted to store the data of a page during said interval;

said device furthermore comprising:

a control device;

a control member having an output which is connected to an input of a control device for unblocking the input of the foreground memory;

a background memory connect between said data connection and said foreground memory adapted to store the data of at least two pages, the input of which connected to the data connection being unblocked by an output signal of said control device;

said background memory comprising:

at least two parallel-connected serial sub-memories which together store the complete data of one page, the data of one character field being distributed between at least two parallel connected serial sub-memories;

said background memory being adapted to successively supply the data of a page, up to a predetermined length of the data under the control of a relative starting address signal from said control device, to the foreground memory by unblocking its input in order to progressively store the data thus supplied as from a predetermined starting address in said foreground memory.

2. A device as claimed in claim 1, wherein said background memory comprises:

at least one module which contains a number of parallel-connected serial sub-memories which equals the number of character field bit signals of the code to be display on said display apparatus;

said serial sub-memories being adapted to communicate in parallel with an input or output of said module when connected thereto.

3. A device as claimed in claim 1, wherein said serial sub-memories are magnetic bubble memories.

4. A device as claimed in claim 1, wherein said serial sub-memories are charge coupled devices.

5. A device as claimed in claim 1, wherein said background memory is a shift memory driven by shift pulses; and said background memory furthermore comprises:

a counter having a counting input which receives counting pulses, together with shift pulses for said serial sub-memories, the counting position thereof thus corresponding to a shift of the data in said seial sub-memories;

an access device of the background memory being unblockable exclusively under the control of a signal from said control device and as from a predetermined counting position from a number of counting positions which equal the number of page parts which can be accommodated in a serial sub-memory, said predetermined counting position being selected by said signal.

6. A device as claimed in claim 5, wherein said access device of said background memory, after having received an unblocking signal, can be blocked again by an output signal of said counter after a number of shift pulses for the background memory which corresponds to the storage length of a part of a page in a serial sub-memory.

7. A device as claimed in claim 6, wherein said counter has a first cycle length corresponding to the capacity of a serial sub-memory, and wherein said counter supplies a partially unblocking signal or a reblocking signal, the reblocking being operative with exclusion of further signals, when the beginning or the end, respectively, of a partial cycle within said first cycle is reached, the length of the partial cycle corresponding to the capacity for one page part within a serial sub-memory.

8. A device as claimed in claim 5, wherein said counter has sub-cycles having a length of one line of said page.

9. A device as claimed in claim 8, wherein said foreground memory is a random access memory having a predetermined capacity; and said counter comprising:

an additional sub-cycle of shorter length, in addition to said sub-cycles of mutually equal length, so that the aggregate lengths of the sub-cycles within a partial cycle whose length corresponds to the capacity for one page part within a serial sub-memory correspond to said predetermined capacity of said foreground memory.

10. A device as claimed in claim 8, wherein said foreground memory comprises:

an address converter, an input of which can receive an address consisting of line and character numbers respectively, from said control device or from the output of said counter, respectively, in order to form a direct memory address for the foreground memory;

an address input of said foreground memory furthermore connected to an address output of said display apparatus.

11. A device as claimed in claim 10, wherein said foreground memory comprises:

a time division multiplex device for rendering the address input of said foreground memory alternately accessible, during successive sub-cycles of said foreground memory, to the address output of the display apparatus for supplying character data for display, and to an address output of said address converter for communication transfer.

12. A device as claimed in claim 5 wherein:

the recurrence time of a memory cycle for a communication transfer in said foreground memory is less than the repetition time for the shift pulses for said background memory, an auxiliary timing device being provided for activating a character code and a memory cycle of said foreground memory for executing said transfer each time a data word position has been prepared by said background memory for transfer.

13. A device for displaying a page of data on a display apparatus comprising:

a data connection for receiving serial character data at a high speed from a sharable external data source;

a dedicated background memory connected to said data connection having serial to parallel conversion input means and at least two parallel connected, serial sub-memories operable at a subharmonic of the frequency corresponding to said high speed for cooperatively storing character bits received therein in parallel;

at least two of said parallel-connected sub-memories cooperatively accommodating the storage of a plurality of display pages and each submemory accommodating serial storage of parts of at least two pages assigned thereto;

a foreground memory accommodating storage of a single page;

first connection means connecting an output of said background memory to an input of said foreground memory;

second connection means connecting an output of said foreground to an input of said display device;

a control device;

a manually actuable control member having an output connected to an input of a control device for generating a relative starting address signal for said background memory for upon the latter arriving thereat unblocking said first connection for thereupon supplying the data of one page, up to a predetermined length thereof to said foreground memory, for being stored therein according to a predetermined, fixed, addressing sequence.

* * * * *